United States Patent
Hashiguchi et al.

(10) Patent No.: US 7,751,345 B2
(45) Date of Patent: *Jul. 6, 2010

(54) OPTICAL NETWORK DESIGN METHOD AND STORAGE MEDIUM FOR STORING DESIGN PROGRAM

(75) Inventors: Tomohiro Hashiguchi, Kawasaki (JP); Toru Katagiri, Kawasaki (JP); Kazuyuki Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

This patent is subject to a terminal disclaimer.

(21) Appl. No.: 11/742,532

(22) Filed: Apr. 30, 2007

(65) Prior Publication Data

US 2008/0080554 A1   Apr. 3, 2008

(30) Foreign Application Priority Data

Sep. 29, 2006   (JP)   ............................. 2006-269361

(51) Int. Cl.
*H04B 10/00*   (2006.01)
*H04B 10/08*   (2006.01)

(52) U.S. Cl. ........................ 370/255; 398/34; 398/35; 703/2

(58) Field of Classification Search ................ 370/254, 370/255; 703/1, 2; 398/34, 35
See application file for complete search history.

(56) References Cited

U.S. PATENT DOCUMENTS

| | | | |
|---|---|---|---|
| 6,094,417 A * | 7/2000 | Hansen et al. | 370/222 |
| 6,763,326 B1 * | 7/2004 | Watkins et al. | 703/21 |
| 6,829,216 B1 | 12/2004 | Nakata | |
| 7,660,527 B2 * | 2/2010 | Hashiguchi et al. | 398/34 |
| 2003/0004845 A1 | 1/2003 | Takeda et al. | |
| 2003/0099014 A1 * | 5/2003 | Egner et al. | 359/124 |
| 2004/0010592 A1 | 1/2004 | Carver et al. | |
| 2004/0221060 A1 * | 11/2004 | Alicherry et al. | 709/238 |
| 2005/0122968 A1 * | 6/2005 | Raza et al. | 370/386 |
| 2005/0185967 A1 | 8/2005 | Hoshida | |
| 2005/0243711 A1 * | 11/2005 | Alicherry et al. | 370/216 |

(Continued)

FOREIGN PATENT DOCUMENTS

| | | |
|---|---|---|
| JP | 2000-293569 | 10/2000 |
| JP | 2003-520496 | 7/2003 |

OTHER PUBLICATIONS

Communication mailed from the Unites States Patent and Trademark Office on Apr. 22, 2009 in the related U.S. Appl. No. 11/463,126.

(Continued)

*Primary Examiner*—Chi H Pham
*Assistant Examiner*—Ahmed Elallam
(74) *Attorney, Agent, or Firm*—Staas & Halsey LLP

(57) ABSTRACT

If exists a client signal of a bandwidth larger than "optical signal bandwidth BW" divided by "the number of utilizable ports P", extracted is a combination(s) of signals including one or more of a signal of a maximum bandwidth, of signals of which a total bandwidth is within the BW and of signals of which the number of total ports required in correspondence with a protection type of each client signal is equal to P, and selected is a combination of which the total bandwidth is a maximum from among the extracted combinations.

16 Claims, 22 Drawing Sheets

U.S. PATENT DOCUMENTS

2006/0045523 A1    3/2006  Kozischek
2007/0264018 A1*  11/2007  Hashiguchi et al. ........... 398/75
2008/0080554 A1    4/2008  Hashiguchi et al.
2008/0159742 A1*   7/2008  Krishnaswamy et al. ...... 398/79

OTHER PUBLICATIONS

Communication mailed from the Unites States Patent and Trademark Office on Nov. 2, 2009 in the related U.S. Appl. No. 11/463,126.

* cited by examiner

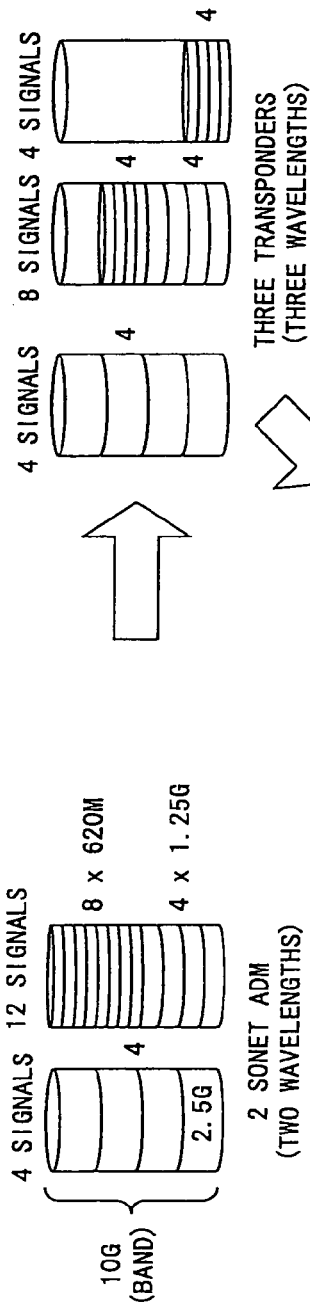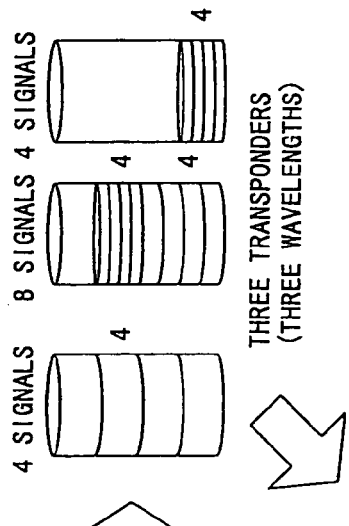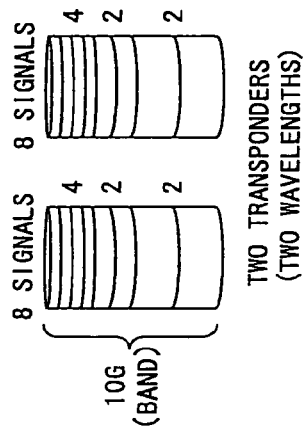
RELATED ART
FIG. 2

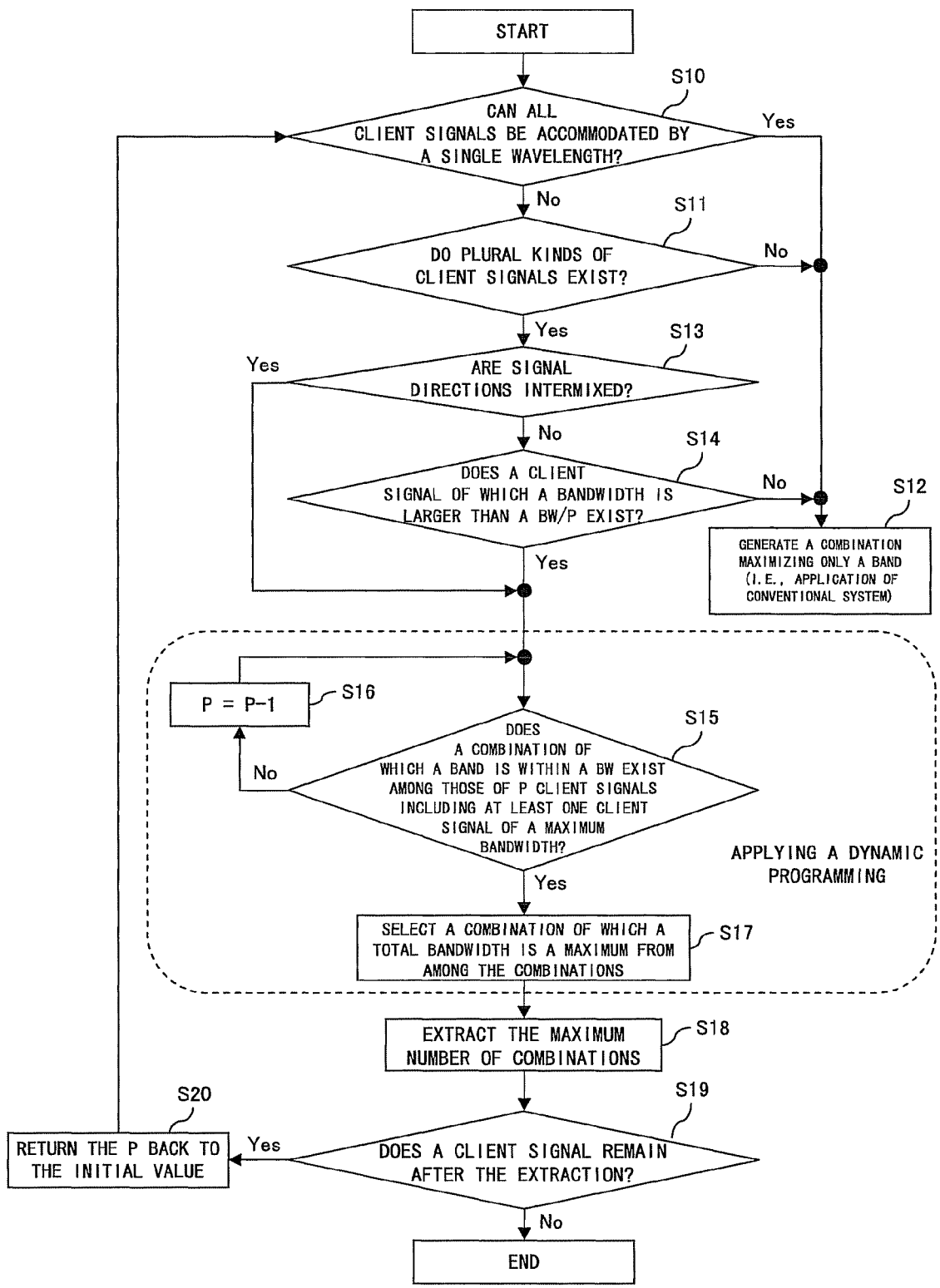
F I G. 5

| SIGNAL | BAND | NO. OF SIGNALS | CP | DIRECTION |
| --- | --- | --- | --- | --- |
| OC48 | 48 | 20 | w | BIDIRECTIONAL |
| GbE | 24 | 40 | w/o | UNIDIRECTIONAL 1 |
| GbE | 24 | 20 | w | UNIDIRECTIONAL 2 |
| OC12 | 12 | 40 | w/o | UNIDIRECTIONAL 2 |

FIG. 6

| SIGNAL CATEGORY | SIGNAL | $B_i$ | $B_i$ (TWO-DIMENSIONAL) | $D_i$ | CP | DIRECTION |
|---|---|---|---|---|---|---|
| $C_1$ | OC48 | 48 | (48 , 48) | 40 | w | BIDIRECTIONAL |
| $C_2$ | GbE | 48 | (48 , 0) | 40 | w/o | UNIDIRECTIONAL 1 (RIGHTWARD) |
| $C_3$ | GbE | 24 | (0 , 24) | 40 | w | UNIDIRECTIONAL 2 (LEFTWARD) |
| $C_4$ | OC12 | 24 | (0 , 24) | 40 | w/o | UNIDIRECTIONAL 2 (LEFTWARD) |

F I G. 7

TARGET FUNCTION $$Maximize: \sum_{i=1}^{k} \{a_i \times (B_i\_right + B_i\_left)\}$$

CONSTRAINT CONDITIONS

1: $0 < \sum_{i=1}^{k}(a_i \times B_i\_right) \leq BW$

2: $0 < \sum_{i=1}^{k}(a_i \times B_i\_left) \leq BW$

3: $\sum_{i=1}^{k} a_i = P$

4: $1 \leq a_i \leq \min[P, D_i]$
   (IF $C_i$ IS A SIGNAL OF A MAXIMUM BANDWIDTH)

5: $0 \leq a_i \leq \min[P-1, D_i]$
   (IF $C_i$ IS NOT A SIGNAL OF A MAXIMUM BANDWIDTH)

6: IF $C_i$ IS A wCP, $A_i$ IS EVEN NUMBER ONLY

DEFINITION
- i IS A NATURAL NUMBER
- $a_i$ IS AN INTEGER EQUALING TO OR MORE THAN ZERO
- k IS THE NUMBER OF SIGNAL CATEGORIES
- $B_i\_right/left$ IS A BAND OF SIGNAL $C_i$
  (RIGHTWARD / LEFTWARD)
    - BIDIRECTIONAL SIGNAL:
      $B_i\_right = B_i\_left = B_i$
    - UNIDIRECTIONAL SIGNAL:
      $B_i\_right = 0$, $B_i\_left = B_i$
      or $B_i\_right = B_i$, $B_i\_left = 0$
- SIGNAL CATEGORY OF A MAXIMUM BANDWIDTH IS ONE HAVING A MAXIMUM OF
  ($B_i\_right + B_i\_left$)
    - IF THERE ARE SIGNALS OF THE SAME CONDITION IN THE BIDIRECTIONAL AND UNIDIRECTIONAL, THE BIDIRECTIONAL IS DETERMINED
    - IF THERE ARE SIGNALS OF THE SAME CONDITION IN A PAIR OF UNIDIRECTIONAL SIGNALS OF MUTUALLY DIFFERENT DIRECTIONS, BOTH ARE DETERMINED
    - IF THERE ARE SIGNALS OF THE SAME CONDITION BETWEEN W CP AND w/o CP INCLUDING DIRECTION, A wCP IS DETERMINED

F I G. 9

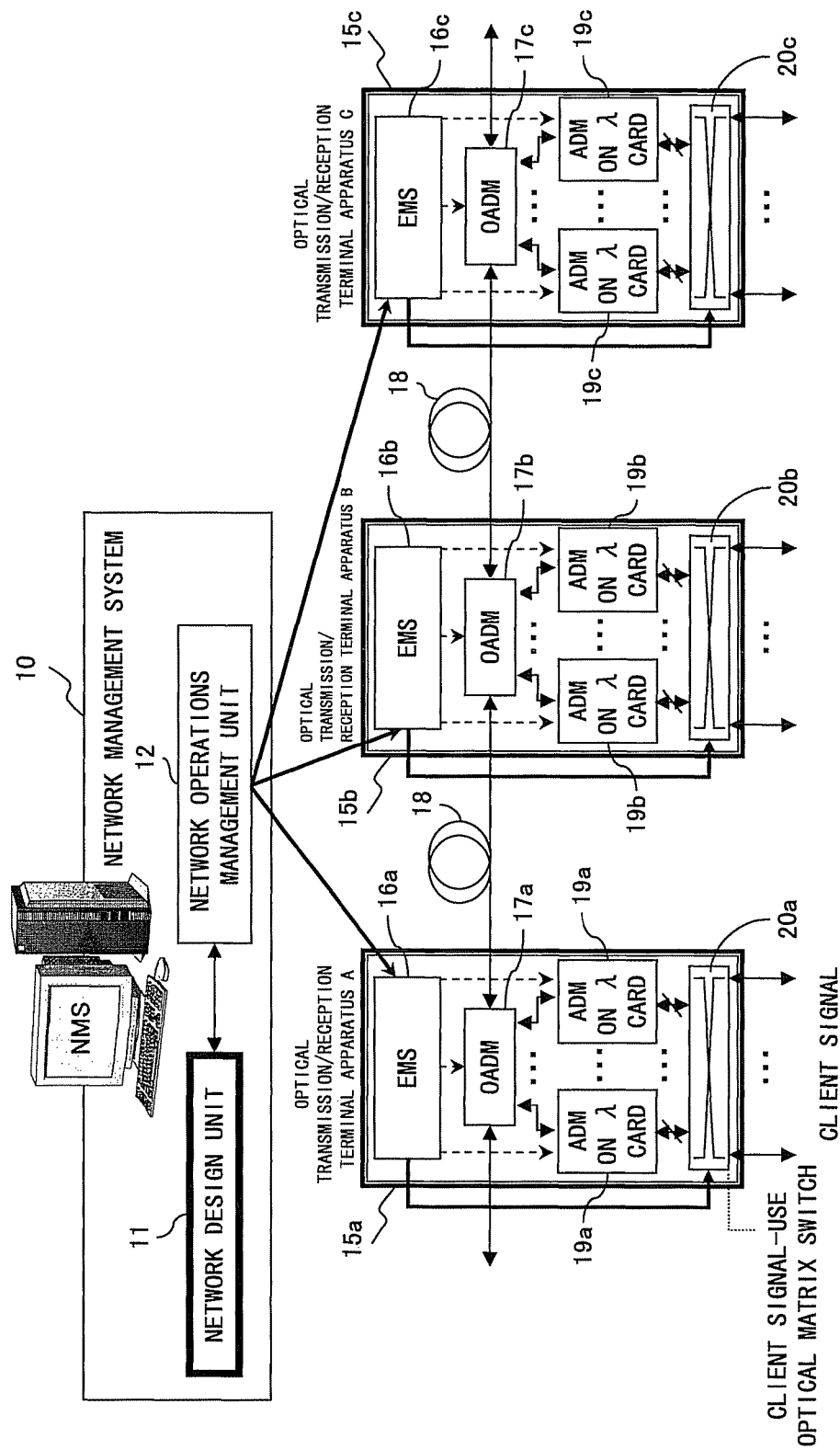
F I G. 21

OPTICAL NETWORK DESIGN METHOD AND STORAGE MEDIUM FOR STORING DESIGN PROGRAM

CROSS REFERENCE TO RELATED APPLICATIONS

This application claims benefit of Japanese Patent Application 2006-269361 filed Sep. 29, 2006, in the Japanese Patent Office, the disclosure of which is hereby incorporated by reference.

BACKGROUND OF THE INVENTION

1. Field of the Invention

The present invention relates to a method of designing an optical network telecommunication system, and specifically to an optimal accommodation design method for accommodating diverse client signals such as a synchronous optical network (SONET) signal and fiber channel signal in a wavelength division multiplexing (WDM) optical network.

2. Description of the Related Art

In recent years, an optical transmission and reception card (commonly called such as "ADM on λ" and "ADM on a card") integrally incorporating a SONET signal (refer to ANSI T1.105 recommendation: Synchronous Optical Network Basic Description Including Multiplex Structures, Rates and Formats), an add/drop function of an SDH signal (refer to ITU-T Recommendation G.803: Architecture of Transport Networks Based on the Synchronous Digital Hierarchy), and a transponder function for an optical signal has been developed. Accordingly, a buildup of an upper layer network accommodating diverse client signals, such as SONET signal, SDH signal (named as "SONET/SDH signal" hereinafter), Ethernet (Registered Trademark) and fiber channel, on a WDM optical network structured by a WDM transmission apparatus has been made possible.

The present invention focuses especially on a design technique for accommodating a client signal accommodated in a SONET/SDH ring network built on a WDM optical network to a SONET/SDH frame.

FIG. 1 is a diagram describing a configuration change of a WDM apparatus. A WDM net and a SONET/SDH net built thereon have conventionally been structured by independently different apparatuses, that is, a WDM apparatus and a SONET/SDH ADM (Add/Drop Multiplexing) apparatus. The WDM apparatus is one performing a wavelength division multiplexing by overlapping an optical signal on different wavelength lights, while the SONET/SDH ADM apparatus is one for applying a time division multiplexing to a client signal of each channel and overlapping it on a single wavelength light. The purposes of design for accommodating a client signal on a network are to accommodate the entirety of the given client signals and also to minimize the number of SONET/SDH apparatuses and the associated apparatus cost. In the case of accommodating a client signal by using a SONET/SDH ADM apparatus, the accommodation has conventionally been carried out so as to increase a band usage ratio of each optical signal by considering a bandwidth of each client signal. The number of client signal ports of a SONET/SDH ADM apparatus is generally large, not requiring a consideration of the number of client signals per optical signal, and therefore a combination maximizing a band usage ratio has been selected in priority regardless of the number of client signals. That is, the conventional accommodation design has been able to provide the entirety of the client signals with interfaces for the number of ports that is capable of accommodating a natural number of client signals obtained by the following expression (1):

(Number of ports on the client signal side)=(optical signal bandwidth of SONET/SDH ADM apparatus)/(bandwidth of one client signal)    (1)

Recent years, however, have been seeing that an ADM function 107 (refer to TRPN 108 in FIG. 1) of a SONET/SDH signal is integrally incorporated into the optical transmission/reception card 106 (which is indicated by a TRPN in FIG. 1) of a WDM apparatus which used to provide only a transponder function of an optical signal as shown on the right side of FIG. 1. This has made it possible to build up a SONET/SDH ring network (i.e., a synchronous digital signal net) in addition to a WDM net only by using a WDM apparatus.

Referring to the right side of FIG. 1, when accommodating a client signal by using an optical transmission/reception card 108, a difference from the case of using the SONET/SDH ADM apparatus is that the number of client signal ports of the optical transmission/reception card 108 is small, that is, up to approximately ten ports at most. Therefore, different from prior times, there are client signals expressed by:

(Signal bandwidth of optical signal of an optical transmission/reception card)/(the number of add/drop ports of client signals of an optical transmission/reception card)<(bandwidth of a client signal)    (2); and expressed by (Signal bandwidth of optical signal of an optical transmission/reception card)/(the number of add/drop ports of client signals of an optical transmission/reception card)≧(bandwidth of a client signal)    (3).

FIG. 2 exemplifies a case of different results of accommodating a client signal between the cases of using the SONET/SDH ADM apparatus and WDM apparatus and that using the WDM apparatus equipped with an optical transmission/reception card. In the case of FIG. 2, four 2.5G channels, four 1.25G channels and eight 620M bps channels are accommodated in 10 Gbps bands with corresponding wavelength. Here, the number of client ports of the optical transmission/reception cards is eight. Here, (Bandwidth of an optical signal)/(the number of add/drop ports of client signals)=1.25 Gbps, so that the client signals satisfying the expression (2) and those satisfying the expression (3) coexist. Only thing what the conventional design using the SONET/SDH ADM apparatus shall achieve is to maximize only a usage ratio of a total band, and therefore the accommodation is carried out in a descending order of band, resulting in generating two optical signals as shown in FIG. 2 (A). In the case of carrying out an accommodation by the optical transmission/reception card likewise by considering only a band usage ratio, however, three pieces of optical transmission/reception cards are necessary as shown in FIG. 2 (B), thus unable to accomplish an optimal accommodation by two pieces of cards as shown in FIG. 2 (C). This is because the conventional method does not consider a limitation of the number of client side ports of the optical transmission/reception card.

Further descriptions on the problems of the conventional optical network design method are provided here. The conventional design of a SONET network accommodates a pair of client signals having the same signal direction (i.e., bidirectional and unidirectional) as a client side protection type in the same optical transmission/reception card. However, more recent optical transmission/reception card furnished with an ADM on λ enables an accommodation of a pair of client signals having different client-side protection types or signal directions between a single pair of optical transmission/reception cards. Therefore, the conventional design method has been faced with the problem of being unable to accomplish an accommodation design of mixing optimal client signals in an optical transmission/reception card.

Also, when building up a SONET/SDH ring network on a WDM mesh network by using an optical transmission/reception card, the conventional method uniquely selects a ring path for accommodating each client signal prior to carrying out an accommodation design, followed by carrying it out. However, there is a possible problem of resulting in an absence of optimal design for a client signal that can take either of a plurality of ring paths because a ring path for accommodating a client signal is fixed in advance.

The problems associated with the optimal accommodation design as described above resembles the problem of an optimal resource allocation for example. For such a conventional technique, a patent document 1 has disclosed a technique having an apparatus in need of using a shared resource bid for a required volume and price of the resource and allocating the resource corresponding to the bid. And a patent document 2 has disclosed a search method for an optimal portfolio for improving a probability of gaining a high profit.

Even the use of such conventional techniques, however, has not been able to solve the problem of not capable of accomplishing an optimal design for accommodating a client signal by an optical transmission/reception card corresponding to client signal demands having different bandwidths, client side protections and signal directions.

[Patent document 1] Published Japanese translations of PCT international publication for patent applications No. 2003-520496 "Resource allocation"

[Patent document 2] Laid-Open Japanese Patent Application Publication No. 2000-293569 "Portfolio presentation method, presentation apparatus and a storage medium for computer program"

SUMMARY OF THE INVENTION

In consideration of the above described problems, an object of the present invention is to provide an optical network design method capable of accomplishing an optimal accommodation design for a client signal that can maximize a utilization a band of an optical signal and the number of client signal accommodation ports of an optical transmission/reception card and minimize the number of required optical transmission/reception cards, in response to a client signal demand including signals that are different from one another in at least one aspect of their bandwidths, client-side protection types and signal directions.

FIGS. 3A and 3B are fundamental functional block diagrams of an optical network design method according to the present invention. FIGS. 3A and 3B show fundamental functional block diagrams of an optical network design method for determining an accommodation configuration of accommodating a client signal in a port of an optical transmission/reception card that outputs, as an optical signal, a plurality of client signals by applying a time division multiplexing thereto of which a protection type on an optical signal side is the same, e.g., unified as 1+1 system.

In the fundamental function shown by FIG. 3A, a computer judges whether or not there exists a client signal of a bandwidth larger than a value as a result of dividing a bandwidth BW of an optical signal by the number of utilizable ports P for a client signal that is determined by the number of required optical transmission/reception cards for each node of an optical network in accordance with an optical signal protection type and by the number of client ports of each optical transmission/reception card in the first step S1. If such a client signal exists, it extracts a combination(s) of client signals including one or more client signal having a maximum bandwidth, of client signals whose total bandwidth is equal to or smaller than the BW, and of client signals whose number of total requirement ports required in correspondence with a client-side protection type of each client signal is equal to the number of usable ports P in the step S2, followed by selecting a combination of client signals whose total bandwidth of the client signals is maximum from among the extracted combinations as the combination of client signals to be accommodated in the optical transmission/reception card in the step S3.

Next, FIG. 3B is a fundamental block diagram of an optical network design method in the case of a signal of a different signal direction existing among client signals to be accommodated in an optical transmission/reception card. The computer first judges whether or not a signal of a different signal direction exists in the step S6. If such a signal exists, it extracts a combination(s) of client signals including one or more client signal whose sum of bandwidths in each direction, or both directions in the case of bidirectional signals, is a maximum, of client signals whose total of signal bands in each direction of all of client signals to be accommodated is equal to or smaller than the BW and of client signals whose number of total ports required in correspondence with an individual client-side protection type of each client signal is equal to a P in the step S7, followed by selecting a combination where a value as a result of adding total bands of band width of each directions of a client signal included in the extracted combinations for all directions is a maximum, in the step S8.

As described above, the present invention enables an accomplishment of an optimal accommodation design for accommodating client signals that are different from one another in at least one of aspect of their bandwidths, client-side protection types and signal directions, in the smallest possible number of optical transmission/reception cards.

The present invention enables an optimal accommodation design for a client signal group that are different from one another in at least one of aspect of their bandwidths, client-side protection types and signal directions, under a condition in which the number of client ports constrained by the number of optical transmission/reception cards is limited, thereby making it possible to minimize the number of optical transmission/reception cards required for accommodating the client signal group when the client signal group is given as a traffic demand, thus contributing in great deal to a reduction of apparatus cost of the entirety of a network.

BRIEF DESCRIPTION OF THE DRAWINGS

FIG. 2 is a description diagram of a conventional example of a client signal accommodation system;

FIG. 5 is an overall process flow chart of an optical network design method according to the present invention;

FIG. 6 is a description diagram of an example of a client signal demand;

FIG. 7 is a description diagram of an example of conversion data of the demand shown in FIG. 4;

FIG. 9 is a description diagram of a target function and of a limiting condition in a client signal combination search process by using a dynamic programming;

FIG. 21 exemplifies a comprisal of an optical telecommunication system applied by the optical network design method according to the present invention.

DESCRIPTION OF THE PREFERRED EMBODIMENTS

Figure 1:
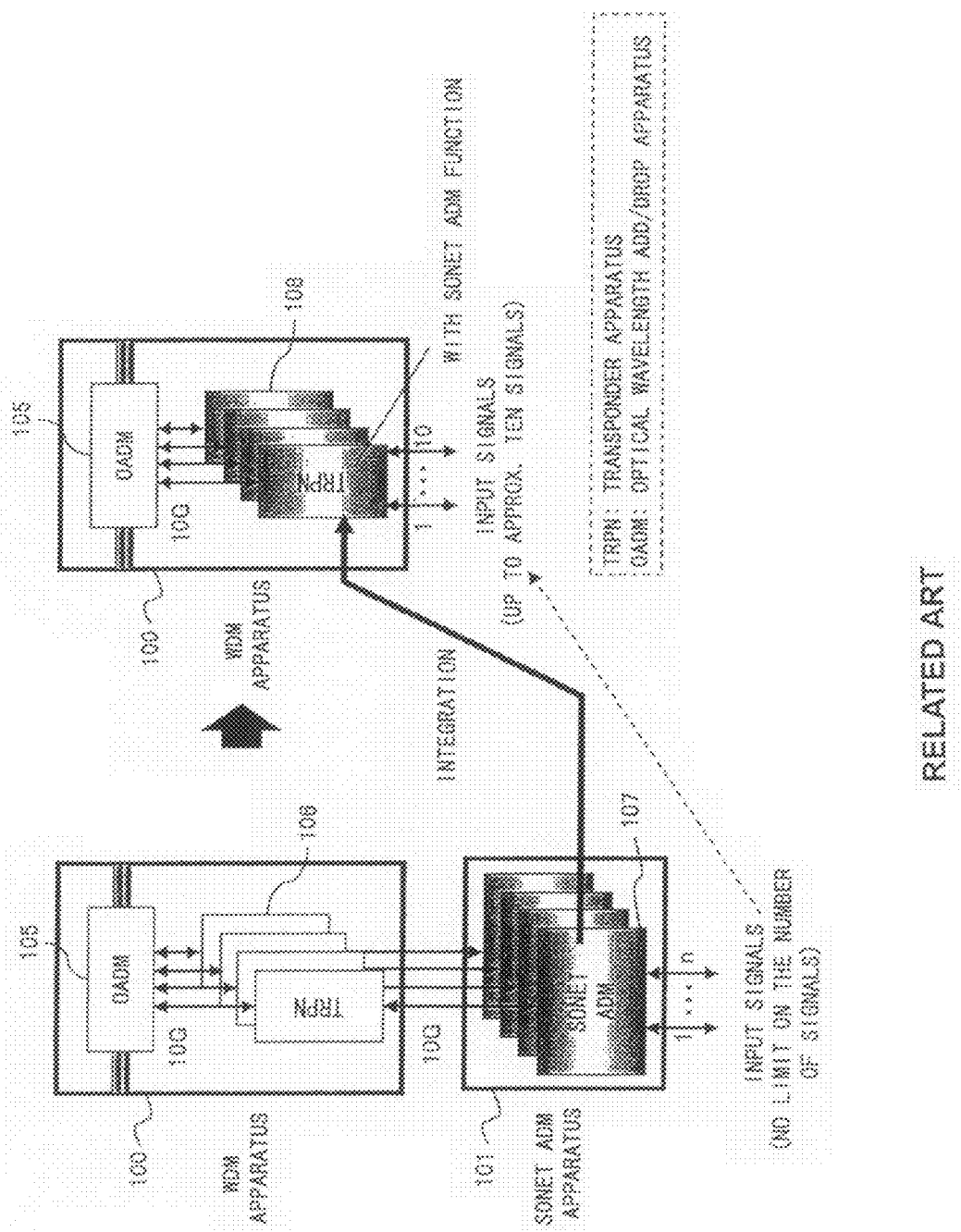
FIG. 1 is a configuration diagram of a conventional example of a WDM apparatus integrating a SONET ADM function.
Figure 3A:
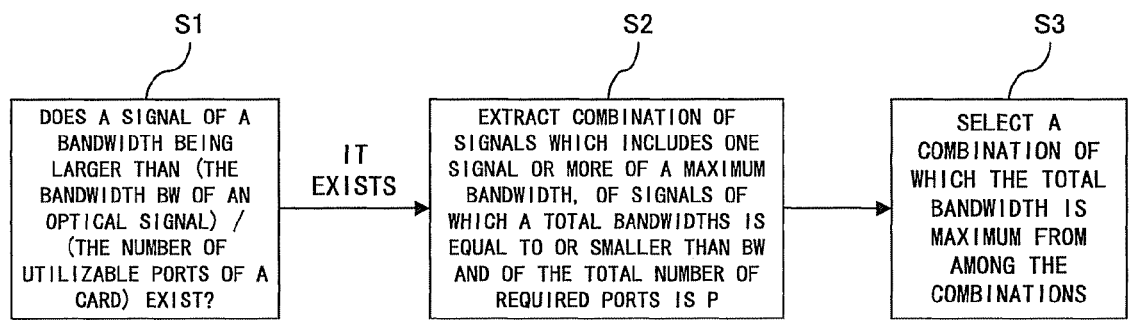
FIGS. 3A and 3B are fundamental functional block diagrams of an optical network design method according to the present invention.
Figure 3B:
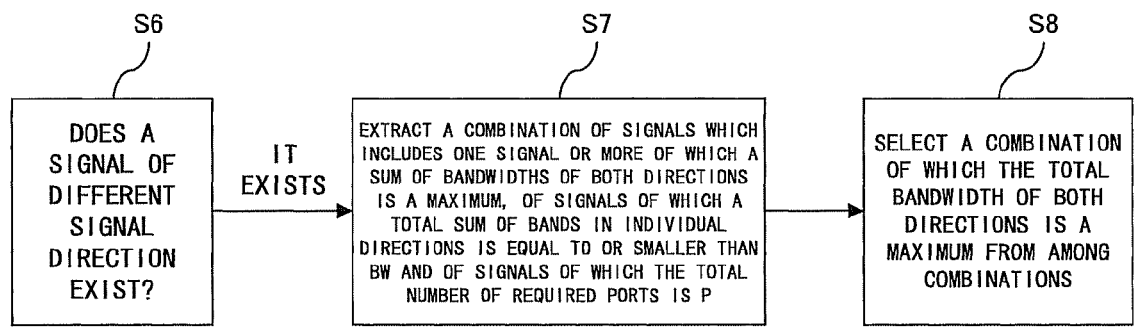
Figure 4:
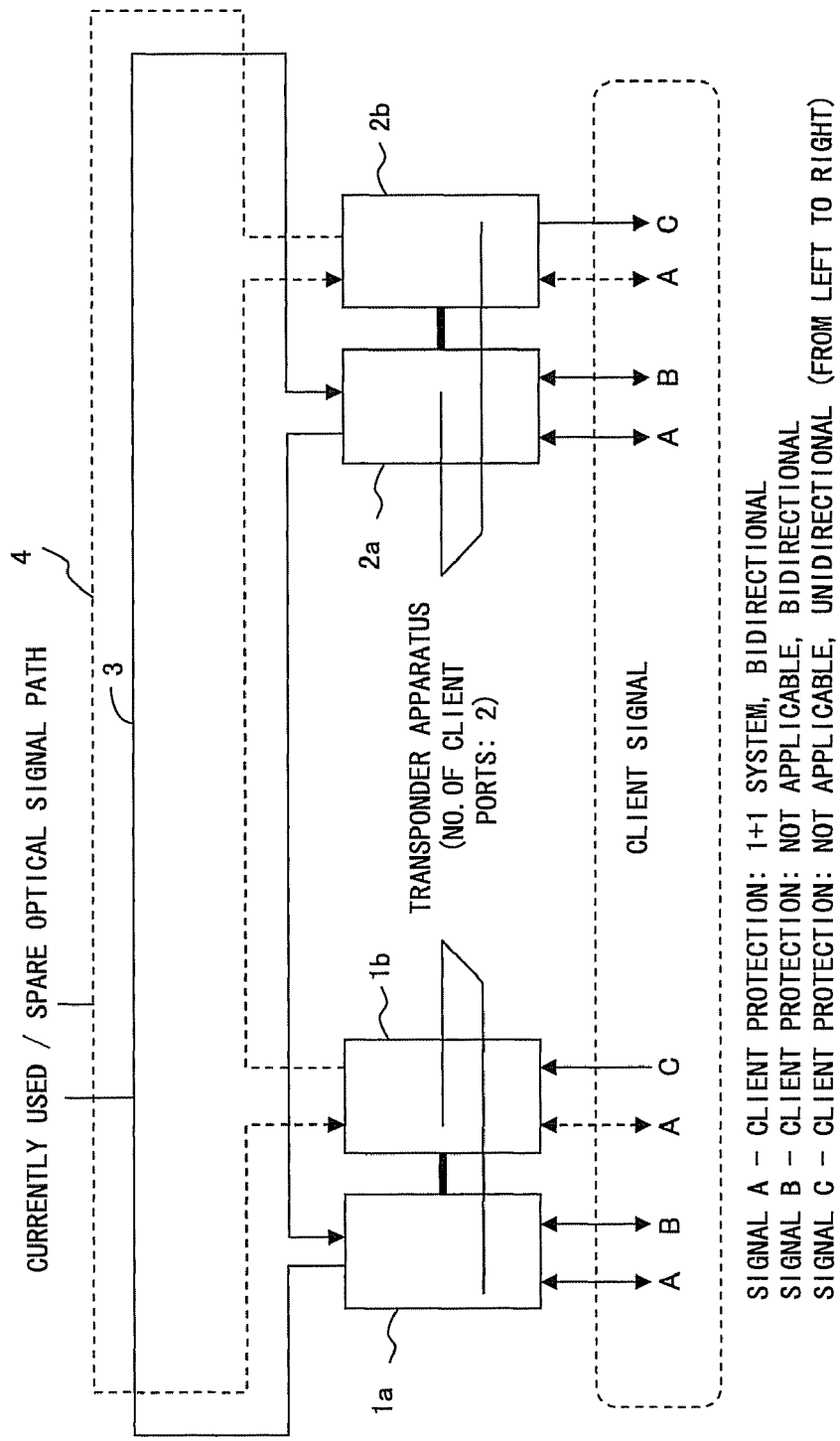
FIG. 4 is a description diagram of an example of a mixed accommodation of various client signals as a target of the present invention.

FIG. 4 exemplifies a configuration of an optical network as a target of the present invention. Referring to FIG. 4, an optical transmission terminal station apparatus on one side is equipped with two transponder apparatuses $1a$ and $1b$ corresponding one on one to individual optical transmission/reception cards, and an optical transmission terminal station apparatus on the other side is equipped with two transponder apparatuses $2a$ and $2b$, and these transponder apparatuses are interconnected by the currently used optical signal path 3 and a spare optical signal path 4.

In the configuration of FIG. 4, three client signals A, B and C are accommodated by two transponder apparatuses within the respective optical transmission terminal station apparatuses. A protection system for the optical signal side is assumed to employ a 1+1 system such as a unidirectional path switched ring (UPSR) of the SONET, and the number of client signal-use ports is two ("2") for each transponder apparatus, that is, each optical transmission/reception card.

Also, the assumption is that the client signal A and client signal B are both bidirectional telecommunication signal between two optical transmission terminal station apparatuses and that the client-side protection type is 1+1 system for the signal A, and there is no protection for the signal B. Also, the client signal C is a unidirectional signal transmitted from a pair of optical transmission/reception cards $1a$ and $1b$ on the left side to a pair of optical transmission/reception card $2a$ and $2b$ on the right side and that there is no client protection for the signals. Also, the number of client ports of an optical transmission/reception card utilized by a signal is different in accordance with a protection type for the signal and that the client signal A utilizes two ports in the respective optical transmission terminal station apparatuses, and the client signals B and C respectively use one port therein.

The inventor of the present invention has filed a patent application with Japan Patent Office by the application number 2006-123908 as a design method for accomplishing an optimal accommodation, in an optical transmission/reception card, of a client signal group in the case of not needing to consider a presence or absence of a client-side protection type or a difference of a signal direction for such an optical network as a target. The present invention is equivalent to an extension of the prior patent application.

The present invention is most fundamentally characterized by using the entirety of client ports of a utilizable optical transmission/reception card and searching a combination(s) of client signals of which a total band is a maximum when a group of client signals of which bands, client-side protection types and signal directions are all different is given. Here, the assumption includes that the optical signal-side protection type of each client signal is the same, e.g., the 1+1 system; the protection type, however, may use another type, e.g., 1:1 system or a ring protection system of the SONET/SDH.

Assumption also includes, as for the optical transmission/reception card, its optical signal band BW and the number of ports capable of accommodating customer signals are provided, and as for each client signal, given are its signal direction (i.e., bidirectional and unidirectional), the number of utilization ports in accordance with a client signal-side protection type and a bandwidth. Note that there are two directions for a unidirectional signal, and therefore there are a total of three kinds of the signal directions. And, as for the client signals, the number of signals are given for each kind of the client signal with the same signal direction, number of utilization ports and bandwidth.

In the case of a direction of all of client signals being the same, the present invention is so contrived as to judge whether or not there is at least one kind of a client signal having a larger bandwidth than a value as a result of dividing a signal band BW by the number of ports P allowing an insertion of the client signal, and if there is one, then extracted are a combination of client signals in which at least one client signal of a bandwidth being a maximum is included, of client signals of which a total sum of signal bands of all client signals to be accommodated in a utilizable optical transmission/reception card is within the BW and of client signals of which the total number of required ports corresponding to a client-side protection type is equal to P. Then, a combination of which a total band of client signals is a maximum is selected as a combination of client signals to be accommodated in an optical transmission/reception card from among the extracted combinations of client signals.

In the case of the signal directions being mixed, instead of one direction, searched is a combination of client signals which use all of client ports of a utilizable optical transmission/reception card and of client signals of which a total bandwidth of both directions is a maximum. As in the case of signal direction being the same, the condition is that the combination naturally includes at least a client signal of which a band is a maximum, that is, a total band of both directions is a maximum. However, it is natural that a total of signal bands in one direction must not exceed the optical signal band BW.

FIG. 5 is an overall process flow chart of an optical network design method for accomplishing the fundamental characteristic of the present invention as described above. Referring to FIG. 5, as the process is started, judged in the first step S10 is whether or not all of client signals can be accommodated in one wavelength and, if they are judged to be not accommodated, then it is judged whether or not there are plural kinds of signals, that is, there is a signal of which a signal direction determining a kind of signal, the number of utilizing ports and a bandwidth are not the same in the step S11. If there are, it is judged whether or not directions of client signals are intermixed in the step S13 and, if they are not intermixed, then it is judged whether or not there is a client signal of which a bandwidth is larger than a value as a result of diving a band BW of an optical signal by the number of utilizable ports P in the step S14, followed by shifting to the process of the step S15 if there is such a signal.

If all the client signals are judged to be accommodated in a single wavelength in the step S10, if plural kinds of client signals do not exist in the judgment of the step S11, and if a client signal of which a bandwidth is larger than the BW divided by P in the judgment of the step S14, then a combination of client signals of which only a band utilization ratio is maximum is generated in the step S12, followed by ending the process. In the step S12, a conventional method is applied for generating simply a combination making the band utilization ratio, which is a simple method maximizing only a total band.

Meanwhile, if the signal directions are intermixed in the judgment of the step S13, the process shifts to the step S15 without carrying out a process of the step S14. That is, it is difficult to determine the number of client signals corresponding to the BW of an optical signal for each direction at this point in time, and therefore the process shift to the step S15 without carrying out a process of the step S14.

The steps S15 through S17 are the most important processes for the optical network design method according to the present embodiment. In this process, a combination of client signals is searched by applying a dynamic programming for maximizing a target function under a certain constraint condition as described later. In this search, a combination of P client signals in which at least one client signal with a maximum bandwidth is included and client signals in which a total band is within the band BW is searched. In the case of signal directions being intermixed, a maximum bandwidth is that a total band in both directions is a maximum.

While the processes of the steps S15 through S17 are described in detail by referring to the flow charts shown in FIGS. 10 through 16, if there is no combination of which a band is within the BW in a combination of the P client signals, then a value of the number of utilizable ports P is decremented in the step S16 and the processes of the step S15 and thereafter are repeated.

If a combination(s) satisfying the condition is extracted in the step S15, a combination of which a total of bandwidths of client signals included in the combination being a maximum is selected from among the combinations satisfying the condition in the step S17. If a plurality of such combinations can be extracted, the maximum number of combinations is selected, while if only one of such combination can be extracted, then one combination is extracted, in the step S18. After the extraction, it is judged whether or not an un-extracted signal still remains in the step S19 and, if such signal remains in the step S20, a value of the P is reverted back to the initial value, that is, the number of client ports of the utilizable optical transmission/reception card, followed by repeating the process of the step S10 and thereafter. Here, the reason for returning to the step S10 is that the remaining client signal may be suitable to be accommodated in a single wavelength for example and therefore the process of the step S19 is necessary for making such a judgment again. If a client signal does not remain in the judgment of the step S19, the process ends.

In the following description, the assumption is that demands of many kinds of client signals in which client-side protection types and signal directions are intermixed are given in between two nodes that are among nodes constituting an optical network. However, an optical signal-side protection type for all client signals is the same, e.g., 1+1 system, and the client-side protection types are two, i.e., the protected and unprotected.

This accordingly makes the number of optical transmission/reception cards required for transmitting one optical signal as two ("2") pieces for each terminal node. Each client signal is categorized into a signal (of the 1+1 system) utilizing two client ports of an optical transmission/reception card and one (without a client protection) utilizing only one port. A client signal of which the client protection system is the 1+1 system is expressed as "with client protection (w CP)", in the following description, and a signal without a client protection is expressed as "without client protection (w/o CP)" in the following description. And the number of total ports of two optical transmission/reception cards is defined as the number of client ports P utilizable by all the client signals.

The present embodiment first names the given client signals as $C_1$ through $C_{x+y+z}$ in the following priority order. The first priority condition is a signal direction, with the priority order being bidirectional, unidirectional 1 (rightward direction), and unidirectional 2 (leftward direction). The second priority condition is a signal band in descending order. The third priority condition is with and without client-side protection (w CP and w/o CP), the w CP being a priority. Here, x, y and z are the number of categories of client signals of which the signal directions are the bidirectional, unidirectional 1 and unidirectional 2, respectively. That is, the signals from $C_1$ to $C_x$ are bidirectional signals, the signals from $C_{x+1}$ to $C_{x+y}$ are unidirectional 1 signals and the signals from $C_{x+y+1}$ to $C_{x+y+z}$ are unidirectional 2 signals.

Here, it is configured to convert input information such as a client signal in accordance with a presence or absence of a client-side protection, or the like. That is, the number of the w CP client signals is multiplied by two, and the signal band of the w/o CP client signals is multiplied by two ("2"). Also, an optical signal band is multiplied by two ("2"), that is, a value of the BW is made twice an actual optical signal band. Then, a combination is extracted by a unit of two of the w CP signals, that is, by including an even number of signals. This is for handling the w CP signal utilizing two ports virtually as two independent signals each of which has a half band. Actually carried out is to multiply the optical signal band and w/o CP signal band by two, respectively, thereby performing relatively the same process, instead of actually making the w CP signal band in this configuration.

The present embodiment is configured to search an optimal combination of a client signals by using a dynamic programming (DP) corresponding to such a conversion result of input information. The first search condition is to include at least one client signal of a maximum band. Note that a bandwidth of a bidirectional signal is handled as a sum of bandwidths in both directions, that is, two times. If there are signals with the same band among the bidirectional signals and unidirectional signals, the bidirectional is selected; and if there are signals with a maximum bandwidth among the unidirectional signals 1 and unidirectional signals 2 at the same time, a combination including at least one from the respective signals is searched.

The second search condition is that the number of utilization ports of a total of client signals included in a combination is a maximum and also within P; the third search condition is that a total bandwidth of respective signal directions included in a combination is within the BW; and the fourth search condition is that the total band of both directions is a maximum.

A combination of client signals satisfying the four search conditions as described above is searched by employing a dynamic programming, which is generally described following a description on an extraction of a combination of client signals according to the present embodiment by using a specific example of a client signal demand.

FIG. 6 shows a specific example of a client signal demand.

Referring to FIG. 6, the assumption of given signals are a bidirectional signal OC 48 as category of client signal, a GbE signal of the w/o CP as a unidirectional 1 (i.e., rightward direction), and a GbE of the w CP and OC 12 as unidirectional 2 (i.e., leftward direction). A bandwidth of each signal is indicated by an STS-1 unit.

FIG. 7 is a conversion result of the input information shown in FIG. 6. In FIG. 7, a band of each signal is handled as a two-dimensional data, the numbers of the w CP client signals $C_1$ and $C_3$ are respectively doubled, and the signal bands of the w/o CP signals $C_2$ and $C_4$ are also respectively doubled.

The next is a description on an example of search corresponding to the post-conversion data shown in FIG. 7. Here, a total of the number of ports of a utilizable optical transmission/reception card is assumed to be P=16. That is, the number of ports of one piece of optical transmission/reception card is eight ("8"). The doubled band is assumed to be 384. That is, it is assumed that a band of an actual optical signal is 192, and that an optical signal corresponding to the OC 192 is used. The number of bidirectional signals x is "1" in this specific example, and a conversion of a band value into two-dimension and a calculation of a $b_1(p)$ (meaning of which is described later) are simultaneously processed, which is different from a later described detail flow chart (i.e., the case of a value of "x" being equal to or larger than "2". An underlined part indicates a selected value and a parenthesized part " " indicates a selected combination from among the same bandwidth in the following description.

Up to a calculation of $BL_1(p)$:

$BLR_1(p)=48p$, $BLL_1(p)=24p$ (p=0, ..., P−1)

$BL_1(p)=\min[\max[48n,24(p-n)]]$; n=0, 1, ..., p $BL_1(1)=\min[\max[0,24], \max[48,0]]=24$ $BL_1(2)=\min[\max[0,48], \max[48,24], \max[96,0]]=48$ $BL_1(3)=\min[\max[0,72], \max[48,48], \max[96,24], \max[144,0]]=48$ $BL_1(4)=\min[\max[0,96], \max[48,72], \max[96,48], \max[144,24], \max[192,0]]=72$ $BL_1(5)=\min[\max[0,120], \max[48,96], \max[96,72], \max[144,48], \max[192,24], \max[240,0]]=96$ $BL_1(6)=\min[\max[0,144], \max[48,120], \max[96,96], \max[144,72], \max[192,48], \max[240,24], \max[288,0]]=96$ $BL_1(7)=\min[\max[0,168], \max[48,144], \max[96,120], \max[144,96], \max[192,72], \max[240,48], \max[288,24], \max[336,0]]=120$ $BL_1(8)=\min[\max[0,192], \max[48,168], \max[96,144], \max[144,120], \max[192,96], \max[240,72], \max[288,48], \max[336,24], \max[384,0]]=144$ $BL_1(9)=\min[\max[0,216], \max[48,192], \max[96,168], \max[144,144], \max[192,120], \max[240,96], \max[288,72], \max[336,48], \max[384,24], \max[432,0]]=144$ $BL_1(10)=\min[\max[0,240], \max[48,216], \max[96,192], \max[144,168], \max[192,144], \max[240,120], \max[288,96], \max[336,72], \max[384,48], \max[432,24], \max[480,0]]=168$ $BL_1(11)=\min[\max[0,264], \max[48,240], \max[96,216], \max[144,192], \max[192,168], \max[240,144], \max[288,120], \max[336,96], \max[384,72], \max[432,48], \max[480,24], \max[528,0]]=192$ $BL_1(12)=\min[\max[0,288], \max[48,264], \max[96,240], \max[144,216], \max[192,192], \max[240,168], \max[288,144], \max[336,120], \max[384,96], \max[432,72], \max[480,48], \max[528,24], \max[576,0]]=192$ $BL_1(13)=\min[\max[0,312], \max[48,288], \max[96,264], \max[144,240], \max[192,216], \max[240,192], \max[288,168], \max[336,144], \max[384,120], \max[432,96], \max[480,72], \max[528,48], \max[576,24], \max[624,0]]=216$ $BL_1(14)=\min[\max[0,336], \max[48,312], \max[96,288], \max[144,264], \max[192,240], \max[240,216], \max[288,192], \max[336,168], \max[384,144], \max[432,120], \max[480,96], \max[528,72], \max[576,48], \max[624,24], \max[672,0]]=240$ $BL_1(15)=\min[\max[0,360], \max[48,336], \max[96,312], \max[144,288], \max[192,264], \max[240,240], \max[288,216], \max[336,192], \max[384,168], \max[432,144], \max[480,120], \max[528,96], \max[576,72], \max[624,48], \max[672,24], \max[720,0]]=240$ The calculation and two-dimension conversion of $b_1(p)$:

$BL_1(15)=240$, $b_1(1)=(\infty,\infty)$
$BL_1(14)=240$, $b_1(2)=(96,96)$, $a_1=2$
$BL_1(13)=216$, $b_1(3)=(\infty,\infty)$
$BL_1(12)=192$, $b_1(4)=(192,192)$, $a_1=4$
$BL_1(11)=192$, $b_1(5)=(\infty,\infty)$
$BL_1(10)=168$, $b_1(6)=(\infty,\infty)$
$BL_1(9)=144$, $b_1(7)=(\infty,\infty)$
$BL_1(8)=144$, $b_1(8)=(\infty,\infty)$
$BL_1(7)=120$, $b_1(9)=(\infty,\infty)$
$BL_1(6)=96$, $b_1(10)=(\infty,\infty)$
$BL_1(5)=96$, $b_1(11)=(\infty,\infty)$
$BL_1(4)=72$, $b_1(12)=(\infty,\infty)$
$BL_1(3)=48$, $b_1(13)=(\infty,\infty)$
$BL_1(2)=48$, $b_1(14)=(\infty,\infty)$
$BL_1(1)=24$, $b_1(15)=(\infty,\infty)$
$BL_1(0)=0$, $b_1(16)=(\infty,\infty)$ The calculation of $b_2(p)$:

$BL_2(15)=(0,360)$, $b_2(1)=(\infty,\infty)$
$BL_2(14)=(0,336)$, $b_2(2)=(\infty,\infty)$
$BL_2(13)=(0,312)$, $b_2(3)=[(\infty,\infty), (48,0)+(192,192), (96,0)+(\infty,\infty)]=(\infty,\infty)$
$BL_2(12)=(0,288)$, $b_2(4)=[(192,192), (48,0)+(\infty,\infty), (96,0)+(96,96), (144,0)+(\infty,\infty)]=(192,96)$, $a_1=2$, $a_2=2$
$BL_2(11)=(0,264)$, $b_2(5)=[(\infty,\infty), (48,0)+(192,192), (96,0)+(\infty,\infty), (144,0)+(96,96), (192,0)+(\infty,\infty)]=(240,96)$, $a_1=2$, $a_2=3$
$BL_2(10)=(0,240)$, $b_2(6)=[(\infty,\infty), (48,0)+(\infty,\infty), (96,0)+(192,192), (144,0)+(\infty,\infty), (192,0)+(96,96), (240,0)+(\infty,\infty)]=(288,96)$, $a_1=2$, $a_2=4$
$BL_2(9)=(0,216)$, $b_2(7)=[(\infty,\infty), (48,0)+(\infty,\infty), (96,0)+(\infty,\infty), (144,0)+(192,192), (192,0)+(\infty,\infty), (240,0)+(96,96), (288,0)+(\infty,\infty)]=(336,96)$, $a_1=2$, $a_2=5$
$BL_2(8)=(0,192)$, $b_2(8)=[(\infty,\infty), (48,0)+(\infty,\infty), (96,0)+(\infty,\infty), (144,0)+(\infty,\infty), (192,0)+(192,192), (240,0)+(\infty,\infty), (288,0)+(96,96), (336,0)+(\infty,\infty)]=(384,192)$, $a_1=4$, $a_2=4$
$BL_2(7)=(0,168)$, $b_2(9)=[(\infty,\infty), (48,0)+(\infty,\infty), (96,0)+(\infty,\infty), (144,0)+(\infty,\infty), (192,0)+(\infty,\infty), (240,0)+(192,192), (288,0)+(\infty,\infty), (336,0)+(96,96), (384,0)+(\infty,\infty)]=(\infty,\infty)$
$BL_2(6)=(0,144)$, $b_2(10)=(\infty,\infty)$
$BL_2(5)=(0,120)$, $b_2(11)=(\infty,\infty)$ $BL_2(4)=(0,96)$, $b_2(12)=(\infty,\infty)$
$BL_2(3)=(0,72)$, $b_2(13)=(\infty,\infty)$
$BL_2(2)=(0,48)$, $b_2(14)=(\infty,\infty)$
$BL_2(1)=(0,24)$, $b_2(15)=(\infty,\infty)$
$BL_2(0)=(0,0)$, $b_2(16)=(\infty,\infty)$ The calculation of $b_3(p)$:
$BL_3(15)=(0,360)$, $b_3(1)=(\infty,\infty)$
$BL_3(14)=(0,336)$, $b_3(2)=(\infty,\infty)$
$BL_3(13)=(0,312)$, $b_3(3)=[(\infty,\infty), (0,48)+(\infty,\infty)]=(\infty,\infty)$
$BL_3(12)=(0,288)$, $b_3(4)=[(192,96), (0,48)+(\infty,\infty)]=(192,96)$, $a_1=2, a_2=2, a_3=0$
$BL_3(11)\ (0,264)$, $b_3(5)=[(240,96), (0,48)+(\infty,\infty), (0,96)+(\infty,\infty)]=(240,96)$, $a_1=2, a_2=3, a_3=0$
$BL_3(10)=(0,240)$, $b_3(6)=[(288,96), (0,48)+(192,96), (0,96)+(\infty,\infty)]=(288,96)$, $a_1=2, a_2=4, a_3=0$
$BL_3(9)=(0,216)$ $b_3(7)=[(336,96), (0,48)+(240,96), (0,96)+(\infty,\infty), (0,144)+(\infty,\infty)]=(336,96)$, $a_1=2, a_2=5, a_3=0$
$BL_3(8)=(0,192)$, $b_3(8)=[(384,192), (0,48)+(288,96), (0,96)+(192,96), (0,144)+(\infty,\infty)]=(384,192)$, $a_1=4, a_2=4, a_3=0$
$BL_3(7)=(0,168)$, $b_3(9)=[(\infty,\infty), (0,48)+(336,96), (0,96)+(240,96), (0,144)+(\infty,\infty), (0,192)+(\infty,\infty)]=(336,144)$, $a_1=2, a_2=5, a_3=2$
$BL_3(6)=(0,144)$, $b_3(10)=[(\infty,\infty), (0,48)+(384,192), (0,96)+(288,96), (0,144)+(192,96), (0,192)+(\infty,\infty)]=(384,240)$, $a_1=4, a_2=4, a_3=2$
$BL_3(5)=(0,120)$, $b_3(11)=[(\infty,\infty), (0,48)+(\infty,\infty), (0,96)+(336,96), (0,144)+(240,96), (0,192)+(\infty,\infty), (0,240)+(\infty,\infty)]=(336,192)$, $a_1=2, a_2=5, a_3=4$
$BL_3(4)=(0,96)$, $b_3(12)=[(\infty,\infty), (0,48)+(\infty,\infty), (0,96)+(384,192), (0,144)+(288,96), (0,192)+(192,96), (0,240)+(\infty,\infty)]=(384,288)$, $a_1=4, a_2=4, a_3=4$
$BL_3(3)=(0,72)$, $b_3(13)=[(\infty,\infty), (0,48)+(\infty,\infty), (0,96)+(\infty,\infty), (0,144)+(336,96), (0,192)+(240,96), (0,240)+(\infty,\infty), (0,288)+(\infty,\infty)]=(336,240)$, $a_1=2, a_2=5, a_3=6$
$BL_3(2)=(0,48)$, $b_3(14)=[(\infty,\infty), (0,48)+(\infty,\infty), (0,96)+(\infty,\infty), (0,144)+(384,192), (0,192)+(288,96), (0,240)+(192,96), (0,288)+(\infty,\infty)]=(384,336)$, $a_1=4, a_2=4, a_3=6$
$BL_3(1)=(0,24)$, $b_3(15)=[(\infty,\infty), (0,48)+(\infty,\infty), (0,96)+(\infty,\infty), (0,144)+(\infty,\infty), (0,192)+(336,96), (0,240)+(240,96), (0,288)+(\infty,\infty), (0,336)+(\infty,\infty)]=(336,288)$, $a_1=2, a_2=5, a_3=8$
$BL_3(0)=(0,0)$, $b_3(16)=[(\infty,\infty), (0,48)+(\infty,\infty), (0,96)+(\infty,\infty), (0,144)+(\infty,\infty), (0,192)+(384,192), (0,240)+(288,96), (0,288)+(192,96), (0,336)+(\infty,\infty)]=(384,384)$, $a_1=4, a_2=4, a_3=8$ The calculation of $b_4(16)$:
$b_4(16)=$"$(384,384)$", $(0,24)+(336,288), (0,48)+(384,336), (0,72)+(336,240), (0,96)+(384,288), (0,120)+(336,192), (0,144)+(384,240), (0,168)+(336,144), (0,192)+(384,192), (0,216)+(336,96), (0,240)+(288,96), (0,264)+(240,96), (0,288)+(192,96), (0,312)+(\infty,\infty), (0,336)+(\infty,\infty), (0,360)+(\infty,\infty)]=(384,384)$, $a_1=4, a_2=4, a_3=8, a_4=0$ The next is a description on a part of the above calculation result. First, the $BL_1(p)$ is a value of a minimum band among maximum values of total bands of each direction of partial combinations in the case of selecting p signals from among signals except for the first signal $C_1$, that is, between the signals $C_2$ and $C_4$. The $BLR_1(p)$ is a total bandwidth within a combination in the case of selecting p signals from among the unidirectional 1 signals, that is, the rightward signals, of the one-dimensional band; and the $BLL_1(p)$ is a total bandwidth in the case of selecting p signals from among the unidirectional 2 signals, that is, the leftward signals.

As a result of the above, what is obtained is a minimum value of "24", as a $BL_1(1)$ for example, as a result of comparing the maximum value of a bandwidth in the case of selecting one from the signals $C_3$ and $C_4$ (i.e., in a partial combination) with the maximum value of a bandwidth in the case of selecting one signal $C_2$ (i.e., in a partial combination).

And, likewise for a $BL_1(2)$, what is obtained is a minimum value of "48" of maximum values of signal bands of three partial combinations, i.e., a combination in the case of selecting two signals from the signals $C_3$ and $C_4$, a combination in the case of selecting one signal from the signal $C_2$ and one signal between the signals $C_3$ and $C_4$, and a combination in the case of selecting two signals from the signal $C_2$. Likewise, the calculation is performed until obtaining $BL_1(15)$.

Next, a $b_1(p)$ is for indicating whether or not a combination in the case of extracting a remaining P−p signals from other signals, that is, signals $C_2$ through $C_4$, following extracting p signals from the signal $C_1$, is possible with the maximum band of an optical signal, and for indicating a total band of a partial combination of the $C_1$, if the combination is possible. In this case, however, the assumption is that the w CP client signals are searched by the unit of two, that is, a combination including an even number of signals is searched, that a combination of extracting an odd number of signals from the signal $C_1$ that is a w CP is determined to be impossible, and that a band of $b_1(p)$ is indicated as an infinity. Whether or not such a combination is possible is judged by a value of a minimum value $BL_1(P-p)$ of a total band of the remaining P−p signals of partial combinations.

Although the value of the $BL_1(15)$ for example is "240", a combination of extracting only one signal from the signal $C_1$ is not permitted, and therefore two-dimensional bandwidths of $b_1(1)$ corresponding to the combination are both defined as an infinite.

Contrarily, although the value of the $BL_1(14)$ is also "240", values of bandwidths of both directions in the case of extracting two signals from the signal $C_1$ are both "96", and an addition of them to "240" does not reach the twice of the bandwidth, i.e., "384". Therefore, it is extracted as a combination satisfying the condition. And a value of $a_1$ indicating the number of signals extracted from the signal $C_1$ is "2" in this case. Likewise, the calculations are performed until obtaining a $b_1(16)$.

The calculations of $b_2(p)$ and $b_3(p)$ are the same as that of $b_1(p)$, and a description thereof is accordingly omitted.

Lastly, a description is on the calculation of $b_4(16)$. For the $b_4(p)$, it is not necessary to obtain a value for the range of p=1 through 15, and instead, it is enough to calculate the $b_4(16)$ corresponding to the number of utilizable ports, that is, P=16. And the value can be calculated by using the already calculated value of $b_3(p)$. First, a $b_3(16)$ indicates a bandwidth of a combination already extracted 16 signals from the signals $C_1$ through $C_3$, meaning that a signal cannot be further extracted from the signal $C_4$ because the 16 signals are already extracted, and therefore the value of the $b_3(16)$ becomes a candidate for a value of the $b_4(16)$.

And a $b_3(15)$ indicates a bandwidth as a result of 15 signals are already extracted from the signals $C_1$ through $C_3$, with the signal $C_4$ allowing only one signal to be extracted, and therefore adding a bandwidth of a result of extracting only one signal to a value of $b_3(15)$ makes a candidate for a $b_4(16)$. Note that, if there are plural candidates for a total bandwidth of a combination result to be selected as the $b_4(16)$, a (384, 384) is eventually selected as a combination suitable to the above described selection condition. Note that the present embodiment is configured to determine $BL_i(0)=0$, $b_i(0)=0$, and $a_1$ (for $b_i(0)$)=0 for a discretionary integer i.

Figure 8:
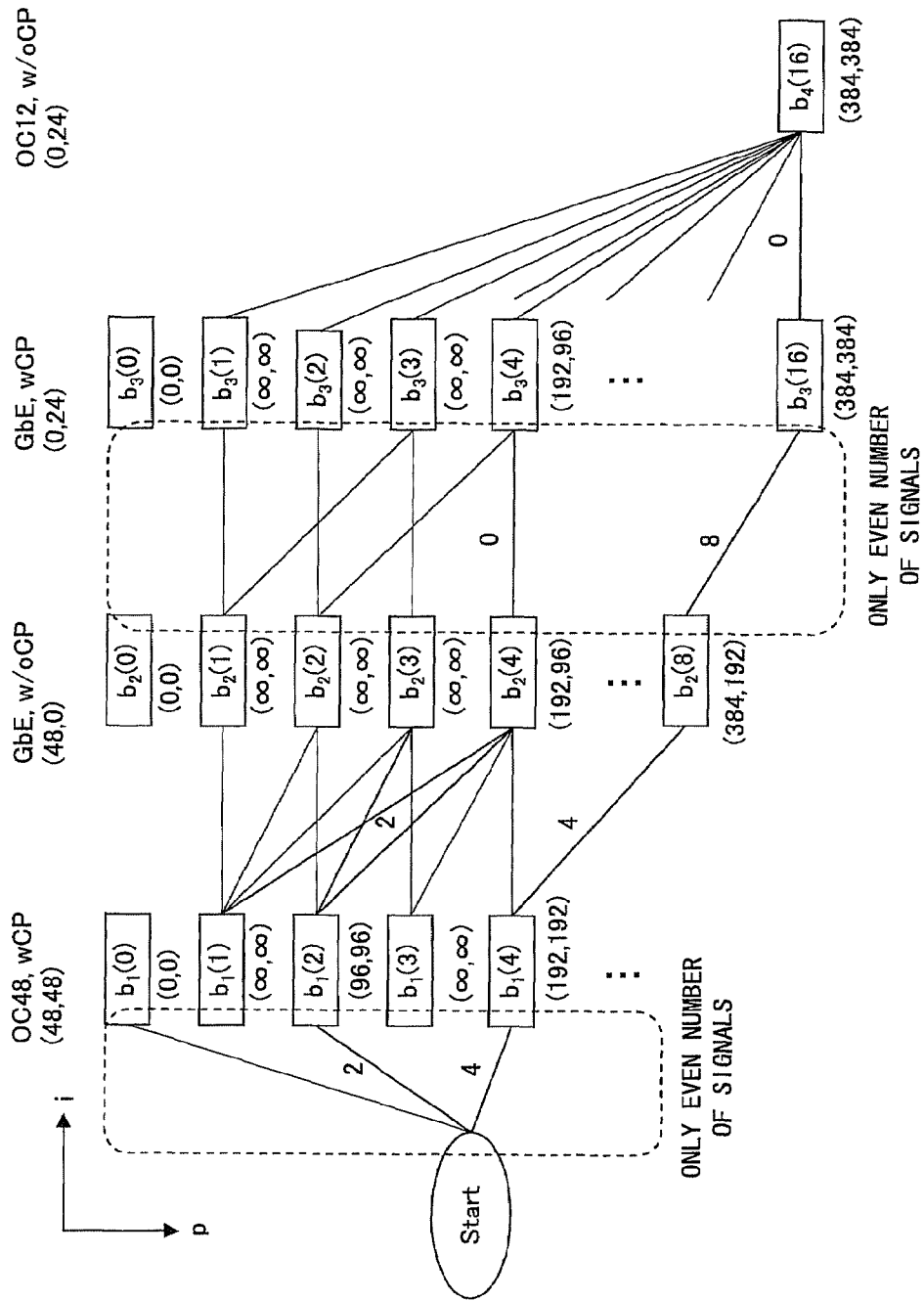
FIG. 8 is a description diagram of a specific example of an optimal combination search process according to the present embodiment.

FIG. 8 is a description diagram of a selection of a combination in the steps 15 through 17 of FIG. 5 corresponding to the above calculation result. Referring to FIG. 8, calculations are carried out sequentially from the upper left, in which the w CP signals are selected by the unit of two, only one optimal signal is kept among the paths included in the respective $b_i(p)$ (where i=1 through 4; p=0 through 16) and the $b_4(16)$ is eventually calculated, followed by going along an optimal path in the reverse direction from the $b_4(16)$, thereby determining a combination to be selected in the step S17. That is, $a_1=4$, $a_2=4$, $a_3=8$, and $a_4=0$ are obtained as values of $a_i$ indicating the number of extraction signals of the i-th signals in accordance with FIG. 8.

By performing a reverse conversion corresponding to the conversion from FIG. 6 to FIG. 7 corresponding to the combination, the numbers of respective client signals in the combinations selected in the step S17 becomes $C_1=2$, $C_2=4$, $C_3=4$ and $C_4=0$. And the number of total utilization of client ports is 16, and a total bandwidth is "192" for both directions, thus becoming a combination utilizing all of the number of ports of an optical transmission/reception card and utilizing the maximum of the band width of OC 192 for respective direction of optical signals.

In response to the client signal demand of FIG. 6, five sets of the combination are extracted in the step S18 shown in FIG. 5. A repetition of the processes in the following step S10 and thereafter further extracts five sets of a combination of client signals $C_1=2$, $C_2=4$, $C_3=0$ and $C_4=8$. In response to the extraction results, the required number of optical transmission/reception cards is for accommodating ten ("10") optical signals for the client signal demand shown in FIG. 6.

The next is a general and yet a detail description on the combination extraction and selection processes in the steps S15 through S17 shown in FIG. 5. First description is on a target function and a constraint condition in a dynamic programming applied to the process by referring to FIG. 9. Referring to FIG. 9, the target function is to maximize the total sum of products of the number of signals $a_i$ extracted from among the number of signals $D_i$ of a discretionary signal $C_i$ and the bandwidths of the signals, that is, the sum of rightward bandwidths and leftward bandwidths. Here, values of i for summing them up are from one ("1") to k, with the value of the k being equivalent to up to x+y+z. As for a bandwidth, it is the same for the rightward and leftward with regard to a bidirectional signal, while the bandwidth of the rightward or leftward is "0" with regard to a unidirectional signal.

Six constraint conditions are given as those for the target function. The first and second constraint conditions are that the sums of bands of the rightward and leftward of the respectively extracted signals are within the bandwidth BW of the optical signal.

The third constraint condition is that the total sum of the number of extracted signals $a_i$ from a discretionary signal $C_i$ is equal to the number of total ports P of an optical transmission/reception card. The fourth constraint condition and fifth constraint condition are both ones regarding the number of extracted signals $a_i$ and, if $C_i$ is a signal of a maximum bandwidth, at least one signal is to be included in the combination of signals, and therefore the value is "1" or larger. And the maximum value is determined to be a minimum value of the total number of ports P and the number of signals $D_i$ as a demand of the signal $C_i$. Contrarily, if the $C_i$ is not a signal of a maximum bandwidth, then a combination not including the signal is permitted, and therefore a value of the $a_i$ is equal to or larger than "0". And a maximum value is determined to be a minimum value of P−1 and $D_i$ because a signal of a maximum bandwidth, that is, at least one of other signals, is to be included in a combination.

The sixth constraint condition is that a value of $a_i$ is only an even number because signals are extracted by the unit of two, if the signal $C_i$ is a w CP as described above.

Note that the configuration is such that a signal of which a sum of a bandwidth of the rightward direction and that of the leftward direction is a maximum is generally adopted as a signal of a maximum bandwidth; if there are signals of the same condition in the bidirectional and unidirectional signals, however, the bidirectional signal is determined. If there is a pair of unidirectional signals of the same condition and of the opposite directions, both signals are determined. And, if there are signals of the same condition in the w CP and w/o CP, including a direction, the signal of w CP is determined.

The next is a detailed description on the process of the steps S15 through S17 carried out by using the target function and constraint conditions as described above, by referring to FIGS. 10, 11 and FIGS. 13 through 16.

Figure 10:
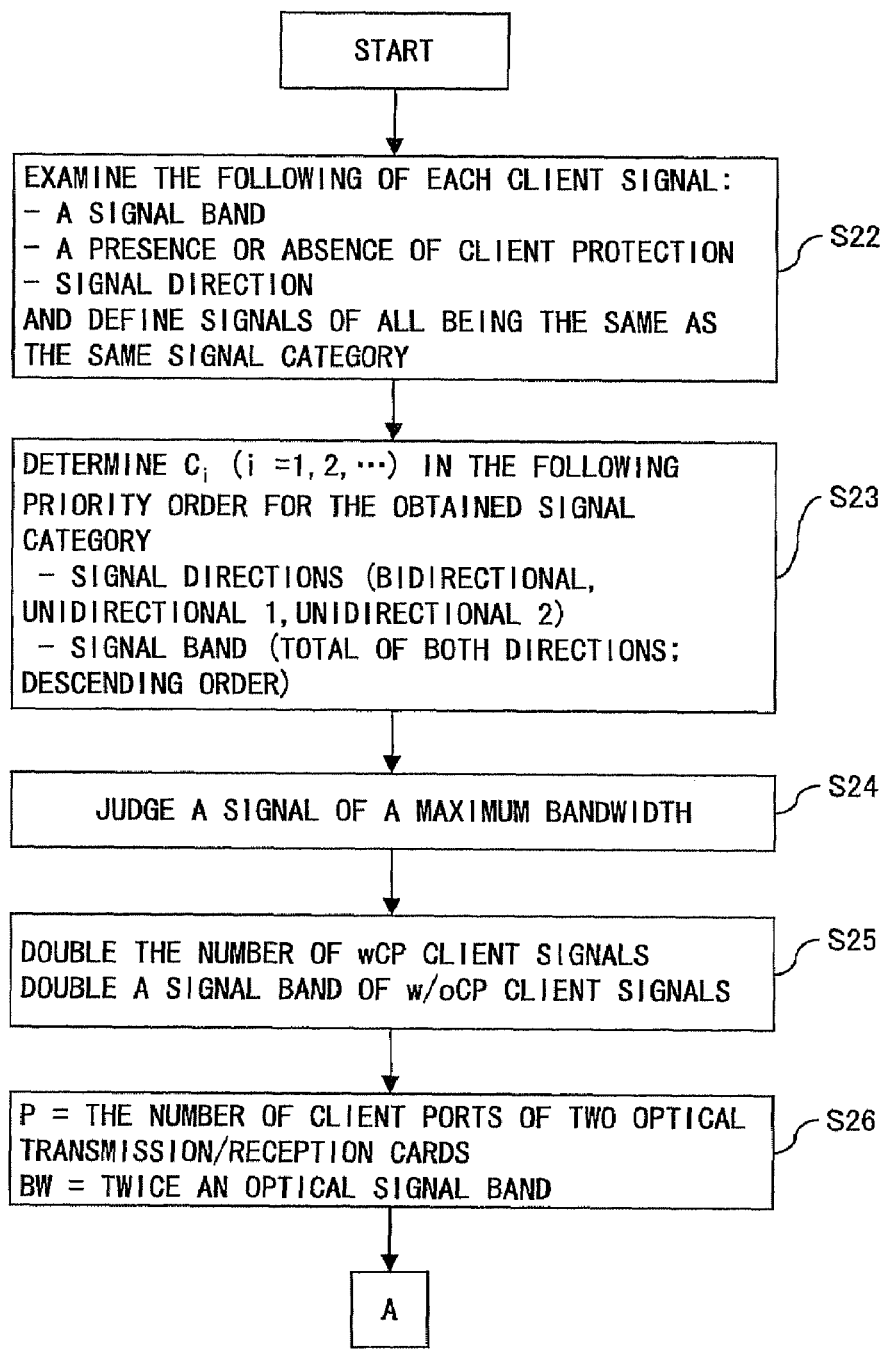
FIG. 10 is a detail flow chart of a client signal combination search process by using a dynamic programming.

FIG. 10 is a description diagram of a preprocess for converting input data corresponding to the client signal demand described in association with FIGS. 6 and 7. Referring to FIG. 10, as the process is started, signals of which a signal band, a presence or absence of client-side protection, and a signal direction, of each client signal are all the same are defined as the same signal category in the first step S22, and a priority order is defined for the signal category in the step S23. The first priority order is a signal direction, placing the priority order of the bidirectional, unidirectional 1 and unidirectional 2. Then, the second priority order is placed for each signal direction in descending order of a signal band, that is, from the larger of a total of signal bands in both directions.

Subsequently, a signal of the maximum bandwidth is judged in the step S24. This judgment is made for judging whether or not a discretionary signal $C_1$ is one of a maximum bandwidth in the process thereafter. Then, the number of the w CP signals is doubled and a bandwidth of the w/o CP signals is doubled in the step S25, and the number of client ports of two optical transmission/reception cards, that is, the sixteen in the above described example, is defined as P, and a double of an optical signal band is defined as BW, followed by shifting to the process of FIG. 11.

Figure 11:
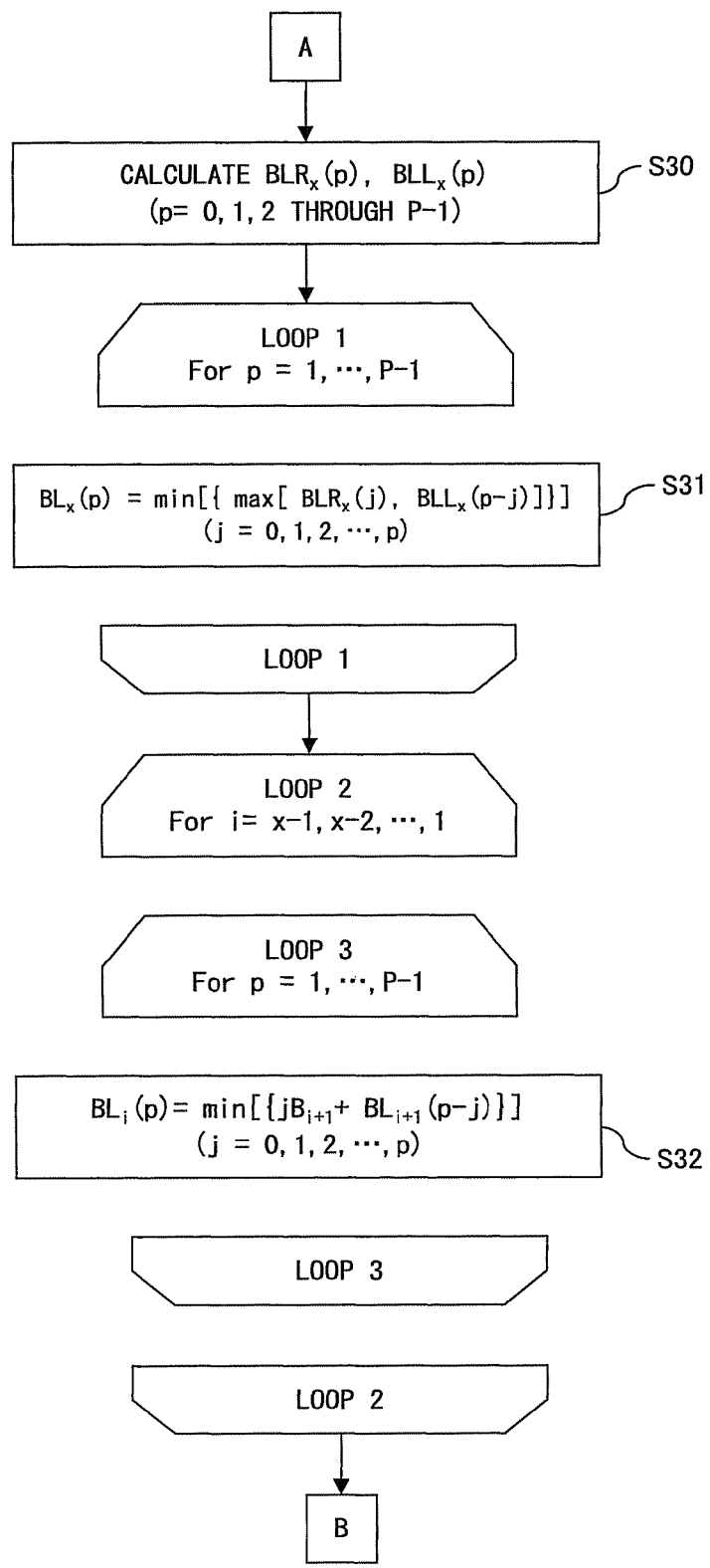
FIG. 11 is a detail flow chart of a client signal combination search process (continued part 1)

Now turning to FIG. 11, basically performed is the process for calculating a value of a BL corresponding to bidirectional signals. This process, defining the bidirectional signals as the number of x categories as described above, starts with the process of calculating a $BLR_x(p)$ and a $BLL_x(p)$ in the first step S30. Here, the $BLR_x(p)$ and $BLL_x(p)$ each is a minimum total band in a partial combination in the case of extracting from i=x+1 and thereafter, that is, down to a $C_{x+y+z}$ based on the priority order in a signal category $C_1$, with the $BLR_x(p)$ being a minimum total band of the unidirectional 1, and the $BLL_x(p)$ being a minimum total band of the unidirectional 2. As for the unidirectional 1, a bandwidth of a signal of the priority order of $C_{y+1}$ and lower is "0", and as for the unidirectional 2, a bandwidth of a signal the priority order of $C_{x+1}$ down to $C_{x+y}$ is "0". Therefore, a minimum total band in the case of extracting p signals from the signals between $C_{max\ [i+1,\ x+y+1]}$ and $C_{x+y}$ for the $BLR_i(p)$, and likewise p signals from the signals between $C_{max\ [i+1,\ x+y+1]}$ and $C_{x+y+z}$ are calculated for value of p from "0" to P−1.

Then, the process of the step S31 is carried out as loop 1 process. Here, what is selected is a signal of a maximum total band from among those of the minimum total band in respective direction in the case of extracting, of p signals to be extracted, j signals from signals of the unidirectional 1 and the rest, i.e., p−j signals, from signals of the unidirectional 2 based on the $BLR_x(p)$ and $BLL_x(p)$ that are obtained in the step S30, and a minimum value is calculated from the maximum total band among those of which a value of j is between "0" and p, thereby defining the values of $BL_x(p)$.

Then, carried out is the process of the step S32 as loop 2 and loop 3 processes. First, the loop 2 substitutes x−1 for a value of i, followed by repeating the processes corresponding to "1" to "P−1" for values of p in the step S32 as the process of the loop 3. In the step S32, first, j signals of the i+1-th signal $C_{i+1}$, that is, a signal of a bandwidth of $B_{i+1}$ are extracted for i=x−1, and sums of the total bandwidth and $BL_{i+1}(p-j)$, i.e., $BL_x(p-j)$ in this event, are calculated for "0" to p for values of j, followed by obtaining the minimum value of the calculated sums as a $BL_i(p)$, that is, a value of a $BL_{x-1}(1)$. The similar processes are repeated for values of the p from p=2 to P−1, followed by substituting x−2 for a value of i in the loop 2, thus continuing the similar processes.

Figure 12:
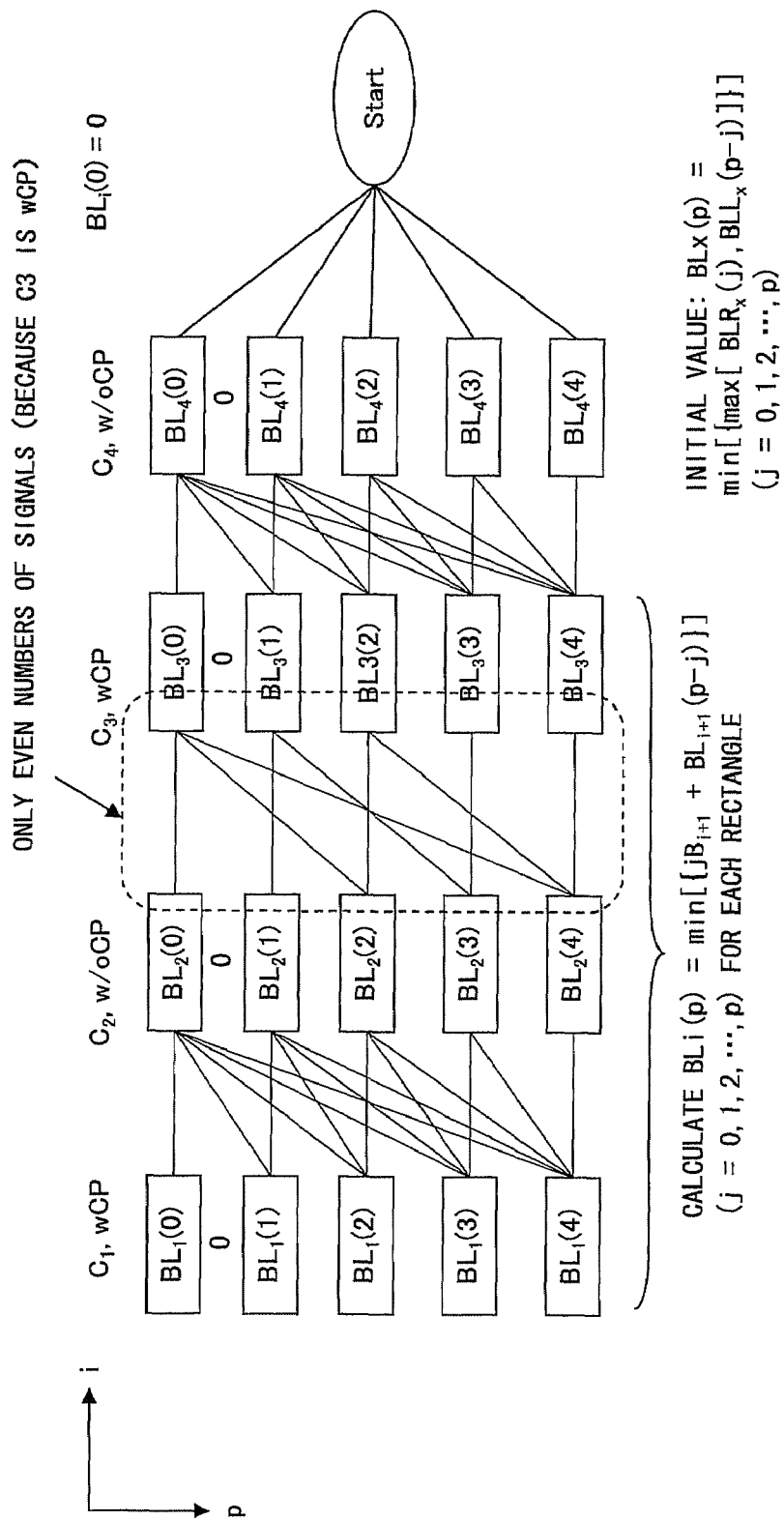
FIG. 12 is a description diagram of a specific example of a minimum total band calculation method shown in FIG. 11.

FIG. 12 is a description diagram of a specific example of processes in the loop 2 and loop 3. As described above, a "0" is substituted for a value of $BL_i(0)$. In FIG. 12, values of $BL_4(0)$ to $BL_4(4)$ corresponding to i=x=4 are calculated in the steps S30 and S31 shown in FIG. 11, the values of $BL_i(0)$ to $BL_i(4)$ corresponding to i=x−1=3 to i=1, with the value (obtained in the steps S30 and S31) being the initial value, are sequentially calculated by decrementing values of i, that is in the rightward direction. In this case, however, assuming that the signal $C_3$ is a w CP signal, the calculation of $BL_2(p)$ is carried out by premising that the even number of signals $C_3$ is extracted between $BL_3(p)$ and $BL_2(p)$.

Figure 13:
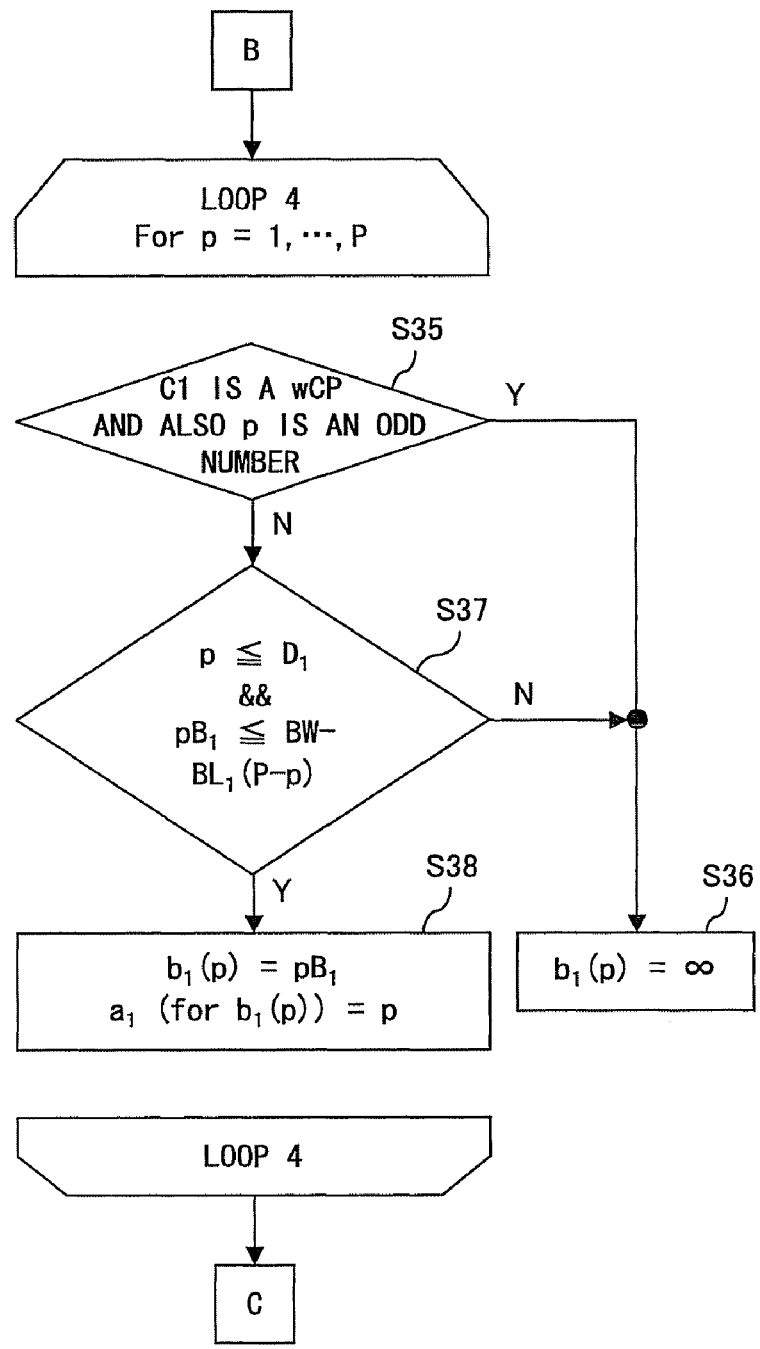
FIG. 13 is a detail flow chart of a client signal combination search process (continued part 2)

Now turning to FIG. 13, the processes of the step S35 through S38, as the process of loop 4, are repeated from p=1 to P, and calculated is a $b_1(p)$ included in a combination possibly output in the step S15 of FIG. 5 in the case of extracting p signals from a signal $C_1$, that is, a maximum total band (of a partial combination) in the case of extracting p signals from the signal $C_1$. Note that a $b_4(p)$ is a maximum total band in the case of extracting p signals from the signals $C_1$ through $C_4$.

In the step S35, first judged is whether or not the signal $C_1$ is a with a customer protection, and also the p is an odd number and, if these conditions are met, a value of the $b_1(p)$ is determined to be infinite in the step S36. The value of infinity indicates that a corresponding combination shall not be extracted in the step S15 as described above. That is, that signals shall be extracted by the unit of the even number of signals from wCP signals is a condition and therefore the value of the $b_1(p)$ is determined to be infinitive as an indication of such an extraction being impossible if the condition is not met.

If the condition of the step S35 is not met, next judged is whether or not a value of p is equal to or smaller than $D_1$, and also a value of $pB_1$ is equal to or smaller than that of $BW-BL_1$ (P−p) in the step S37. Here, the $D_1$ is the number of client demand signals with respect to the signal $C_1$, indicating that the number of signals extracted from the signal $C_1$ shall apparently not exceed the value of $D_1$.

Meanwhile, the $BL_1(P-p)$, being different from the meaning of the p in the $BL_i(p)$ in the step S32 shown in FIG. 11 for example, indicates a minimum total band of a combination of a remaining P−p signals in the case of extracting p signals from the signal $C_1$ and the remaining P−p signals from signals of the priorities of $C_2$ and thereafter. Unless a value as a result of the value of the minimum total band being subtracted from the bandwidth BW of an optical signal is equal to or greater than a value of the $pB_1$ on the left side of the second inequality in the step S37, such a combination cannot apparently be extracted in the step S15 shown in FIG. 5. Then, if the condition of the step S37 is not met, the process shifts to the step S36. Contrarily, if the condition is met, the $pB_1$ is substituted for a value of $b_1(p)$ and the p is substituted for a value of $a_1$ corresponding thereto, that is, the p is substituted for a value $a_1$ of the number of signals extracted from the signal $C_1$ in the step S38. Such a process in repeated until p=P, followed by shifting to the process of FIG. 14.

Figure 14:
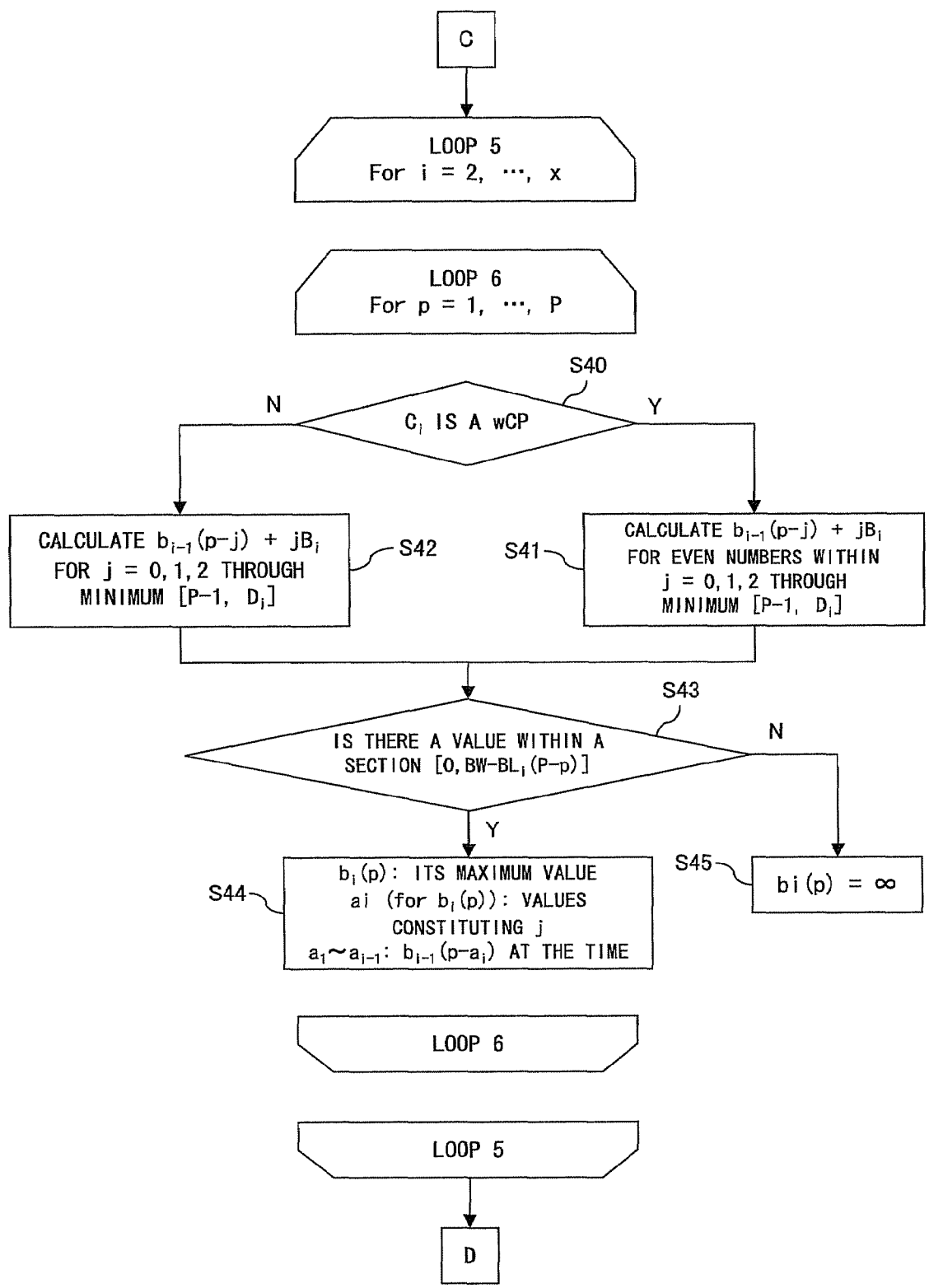
FIG. 14 is a detail flow chart of a client signal combination search process (continued part 3)

In FIG. 14, a combination(s) of signals within the range of bidirectional signals is extracted based on the value of the $b_1(p)$ obtained in the step S38 shown in FIG. 13. That is, the processes of the steps S40 through S45 are repeated for the loops 5 and 6. First in the loop 5, a "2" is substituted for a value of i and the process of the loop 6 are repeated for p=1 through P.

First it is judged whether or not a signal $C_i$, that is, the $C_2$ in this event, is a w CP in the step S40 and, if it is a w CP, a total bandwidth in the case of extracting j signals $C_2$ by the unit of two is calculated as $jB_i+b_{i-1}(p-j)$ in the step S41. The values of j are in the range from "0" to a minimum value between P−1 and $D_1$. If the signal $C_2$ is not a w CP, a total bandwidth is calculated for values of j from j=0 to a minimum value between P−1 and $D_1$ in the step S42. The reason for using the P−1, in place of P, in this event is that a signal of a maximum bandwidth is in a signal of i=1 if it is a bidirectional signal, while the signal of a maximum bandwidth is in a signal of i>x if it is not a bidirectional signal, and as for signals of i=2 through x, P signals cannot be extracted respectively.

After the process of the step S41 or step S42, it is judged in the step S43 whether or not a value within a $BW-BL_2(P-p)$ is among the total bandwidth calculated in either of the step S41 or S42, and if all exceed the value, a combination cannot be selected and therefore the value of $b_i(p)$ is substituted by an infinity in the step S45. Contrarily, if there is a value meeting the condition in accordance with the judgment of the step S43, a value of a $b_i(p)$, that is, $b_2(1)$ in this event, is first substituted as the value meeting the condition; an $a_i$, that is, the number of signals, i.e., $a_2$, extracted from the signal $C_2$ is determined to be the value of j in this event; and the number of extraction signals for the i that is less than a value of j is determined to be values constituting a $b_{i-1}(p-a_i)$, in the step S44. Then a value of p is incremented and the processes of the steps S40 through S44 are repeated until p=P in the loop 6, followed by substituting "3" for a value of i and repeating the processes until the value reaches at an x, further followed by shifting the process to those of FIG. 15.

Figure 15:
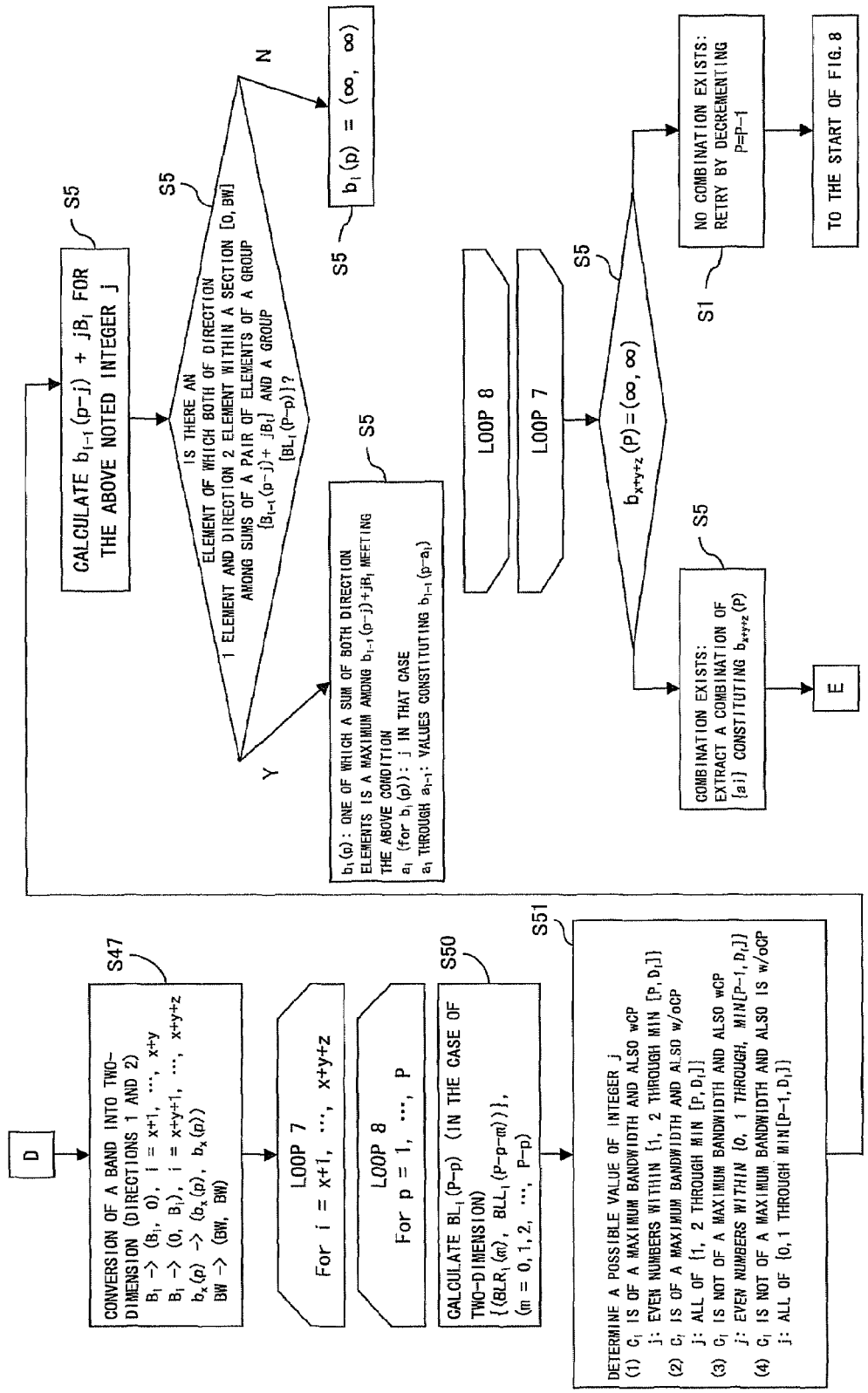
FIG. 15 is a detail flow chart of a client signal combination search process (continued part 4)

Now turning to FIG. 15, carried out is a process for searching a combination(s) including P signals equivalent to the number of ports as a total including unidirectional signals. Prior to the process, performed is the process for converting a band into two-dimension in the step S47. In the "two-dimension conversion" process, bands are calculated for two dimensions, i.e., the signal directions 1 and 2. That is, for signals of the unidirectional 1, that is, the signals of i indicating a signal category being from x+1 to x+y, a two-dimensionally converted band of the band $B_i$ is expressed by a $(B_i, 0)$; and for signals of the unidirectional 2, that is, the signals of i being from x+y+1 to x+y+z, a two-dimensionally converted band is expressed by a $(0, B_i)$. Also, a $b_x(p)$ and the band BW of an optical signal are also handled by being two-dimensionally converted, such as $(b_x(p), b_x(p))$ and $(BW, BW)$.

Subsequently performed are the processes of the steps S50 through S55 as those of a loop 7 and of a loop 8. First, an x+1 is substituted for i at the start of the loop 7, and p=1 is substituted at the start of the loop 8, followed by calculating a $BL_i(P-p)$ in the step S50. In this event, first calculated is a $BL_{x+1}(P-1)$. Likewise the above description, the $BL_{x+1}(P-1)$ here is a minimum total bandwidth in the case of extracting a remaining P−p signals from signals with lower priorities than the i-th signal, that is, the signals of i=x+2 through x+y+z after extracting p signals, that is, one signal in this event, from the i-th signal, that is, signals of priority orders down to x+1-th. When calculating the total bandwidth, extracting m signals from signals of the unidirectional 1 results in extracting P−p−m signals from signals of the unidirectional 2 (i.e., totaling at P−p signals from both directions). Accordingly, a total bandwidth is calculated for the values of m from "0" to P−p.

Then, likewise the process of the step S41 or S42 shown in FIG. 14, performed is the process of calculating $b_{i-1}(p-j)+jB_i$. Prior to the calculation, a possible value (s) of integer j is determined in the step S51. First, if a signal $C_i$ is that of a maximum bandwidth and also with a client protection (i.e., w CP), a value of j is an even number in the range from "1" to a minimum value of P and $D_1$, while if the signal $C_i$ is of a maximum bandwidth and without a client protection (i.e., w/o CP), all integers within the aforementioned range constitute the values of j. If the signal $C_i$ is not of a maximum bandwidth and is a w CP, possible even numbers from "0" to a minimum value of P−1 and $D_1$ is determined to be j, and if the signal is not of a maximum band and is a w/o CP, all integers within the range are determined to be possible values of j.

Then, calculated is $b_{i-1}(p-j)+jB_i$ for the values of the determined j, likewise the steps S41 or S42 of FIG. 14, in the step S52, followed by judging whether or not there is an element of which an element on the direction 1 side and one on the direction 2 side are both within a section between "0" and the band BW of an optical signal among sums of a pair of elements of a set of the value thusly obtained in the step S52 and of a pair of elements of a set of $BL_i(P-p)$, in the step S53. This judgment corresponds, for example, to the inequality on the lower side of the two inequalities in the step S37 shown in FIG. 13.

What has been judged in the step S37 is whether or not a sum of $pB_1$ (corresponding to a value calculated in the step S52) and $BL_1(P-p)$ (corresponding to a $BL_i(P-p)$) is within the BW, and the similar judgment is accordingly made for a sum of a pair of elements of the two sets in the step S53.

If the judgment result is "no", an infinity is substituted for a value of $b_1(p)$, that is, a suitable combination is judged to be not selectable in the step S55, while if the judgment result of the S37 is "yes", a set of which a sum of elements in both directions is a maximum, among the $b_{i-1}(p-j)+jB_i$ meeting the condition of the step S53, is determined to be $b_i(p)$, that is, $b_{x+1}(1)$ in this event; values of j are determined to be $a_i$ in this event; and values constituting a $b_{i-1}(p-a_i)$ are determined to be $a_1$ through $a_{i-1}$, in the step S54. Then, a "2" is substituted for the value of p and the processes of the steps S50 through S55 are repeated for the similar processes for the values of p up to P in the loop 8, followed by repeating the similar processes after an x+2 is substituted for a value of in the loop 7.

Figure 16:
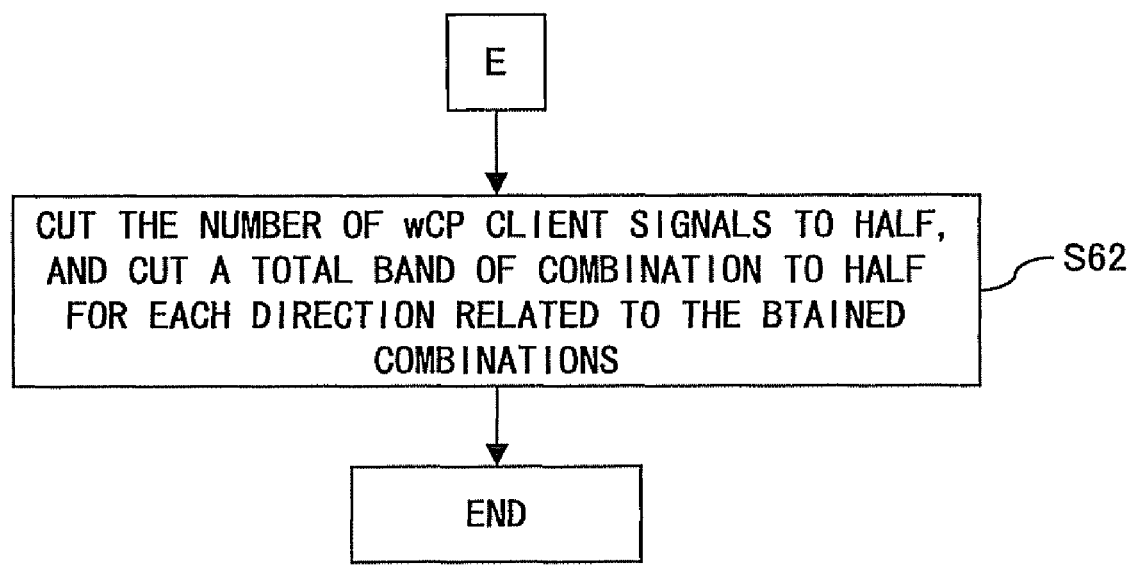
FIG. 16 is a detail flow chart of a client signal combination search process (continued part 5)

Upon completion of the process of the loop 7 up to i=x+y+z, it is judged whether or not it is impossible to extract with a band of a combination being in excess of the BW as a result of extracting a total of P signals from those of the eventually obtained $b_{x+y+z}(P)$, that is, a total of x+y+z categories of signals in the step S57, and if it is not such a case, it is judged that there is a combination in the step S58, followed by calculating an $a_i$ constituting $b_{x+y+z}(P)$, that is, a combination(s) of the number of signals extracted from each signal, and shifting to the process of FIG. 16. If it is judged in the step S57 that the band is not within the BW, a value of P is decremented in the step S16 likewise the process of FIG. 5, followed by starting the process of the step S15, that is, re-performing the process of FIG. 10.

Turning to FIG. 16, the number of client signals with a client protection with regard to the obtained combination(s) is cut to half and a total band of the combination is also cut to half for each direction as processes corresponding to a reverse conversion of a conversion carried out for the client signal demand described in FIG. 7, followed by ending the process.

Figure 17:
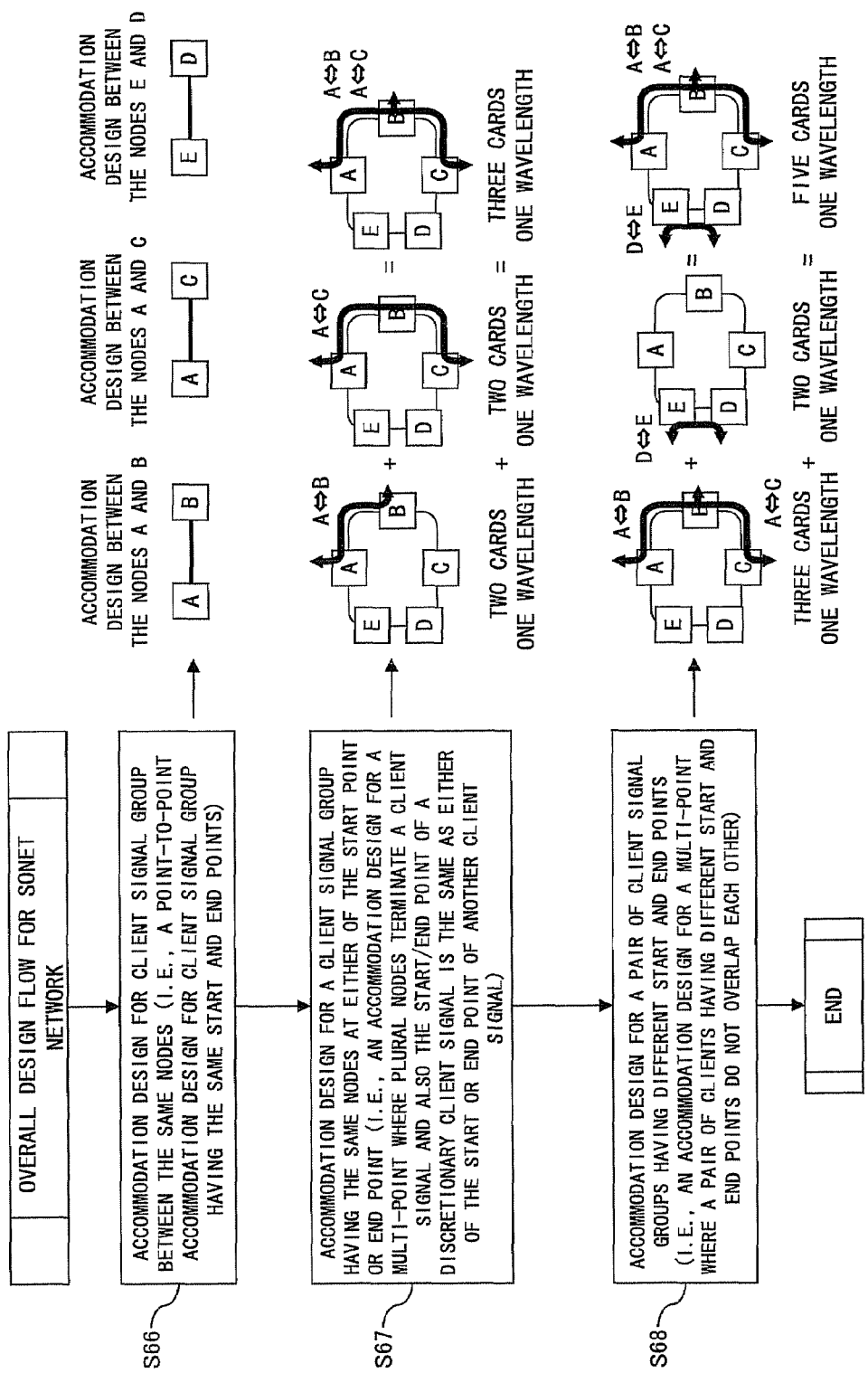
FIG. 17 is a flow chart of an overall design process of a SONET network according to the present embodiment.

The present embodiment is configured to carry out an overall design of a more complex SONET/SDH ring network (noted as "SONET network" hereinafter) by utilizing an optimal accommodation design for a client signal group corresponding to a client signal demand between the two optical transmission terminal apparatuses described above in detail, that is, between two nodes. FIG. 17 is a flow chart of the overall design. Referring to FIG. 17, first performed is an accommodation design of a point-to-point for a signal group between the same nodes, that is, the start and end points are respectively the same by using the design method as described above, in the step S66. The assumption here is that this design has achieved an accommodation design between nodes A and B, nodes A and C, and nodes E and D, for example.

Then, performed is an accommodation design for a client signal group as an entirety of the SONET network by using the design result of the step S66 in the steps S67 and S68. Prior to the process, the combination(s) of client signals generated in the step S66 and information of ring paths within the network are stored in memory (not shown herein), and they are utilized for the processes of the steps S67 and S68.

Figure 18:
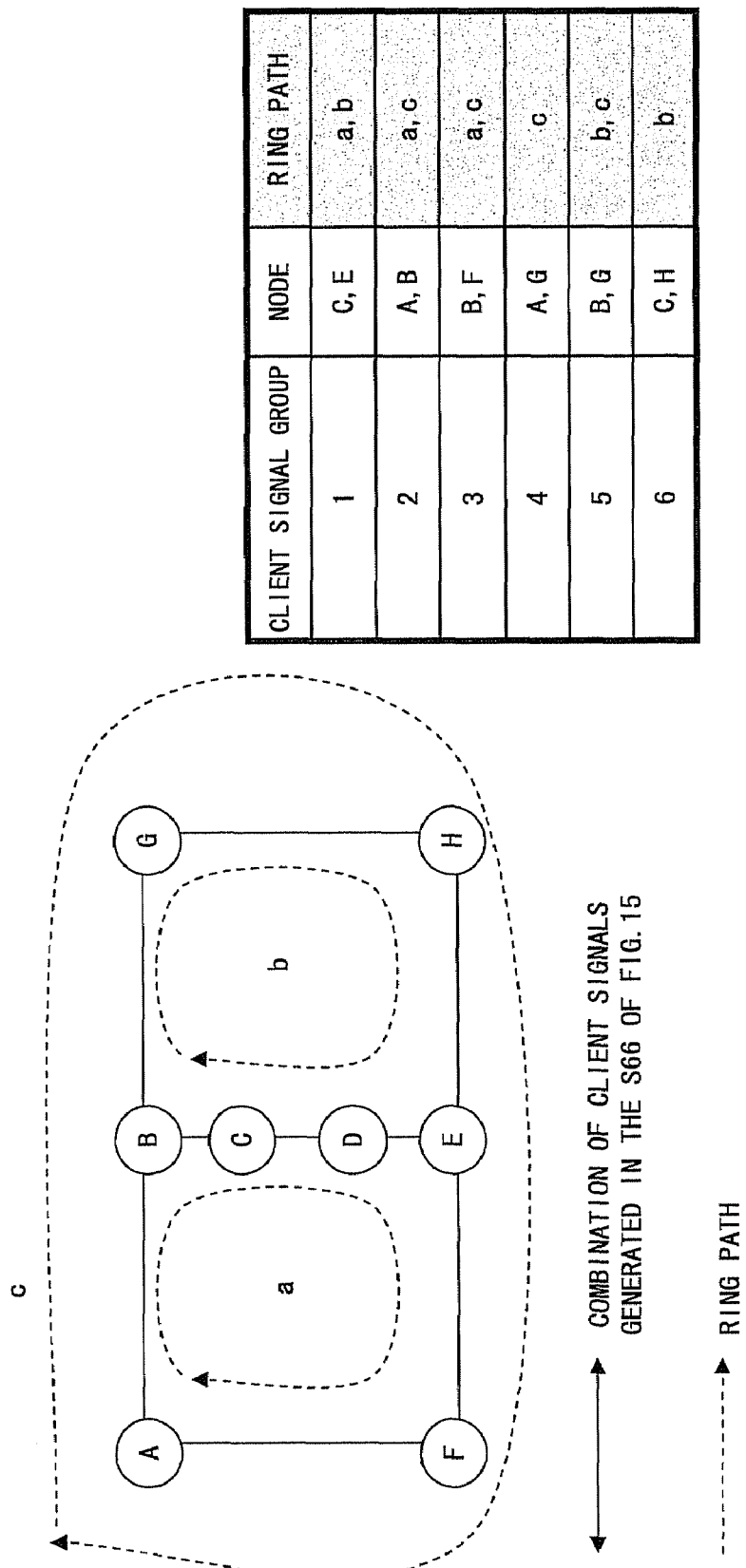
FIG. 18 is a description diagram of an example of information regarding each client signal group used for the overall design process shown in FIG. 16.

FIG. 18 exemplifies such retention information. Referring to FIG. 18, the retained information for client signal groups 1 through 6, each of which has the same start and end nodes, includes the both end nodes, and information of a utilizable ring path.

Returning to the step S67 of FIG. 17, an accommodation design for a client signal group having the same node at either of the start node or end node is performed, resulting in carrying out an accommodation design for a client signal group that is an addition of the accommodation design result for the section of the nodes A and B in the step S66 and accommodation result for the section of the nodes A and C. The result of the accommodation design carried out in the step S66, premising that the signal direction is bidirectional, is enabled by using two optical transmission/reception cards and one wavelength, respectively, while the accommodation design as the addition result is enabled by using three optical transmission/reception cards and one wavelength. Incidentally, a detail of process of the step S67 is described by referring to FIG. 19.

In the step S68, an accommodation design for a pair of client signals with both of the start and end nodes being different from each other is performed, resulting in carrying out an accommodation design for a client signal group that is in the form of an addition of the accommodation design result by using three optical transmission/reception cards and one wavelength performed in the step S67, and an accommodation design for the section of the nodes E and D performed in the step S66. The design result is implemented by using five optical transmission/reception cards and an optical signal of one wavelength. Incidentally, a detail of process of the step S68 is described by referring to FIG. 20.

Figure 19:
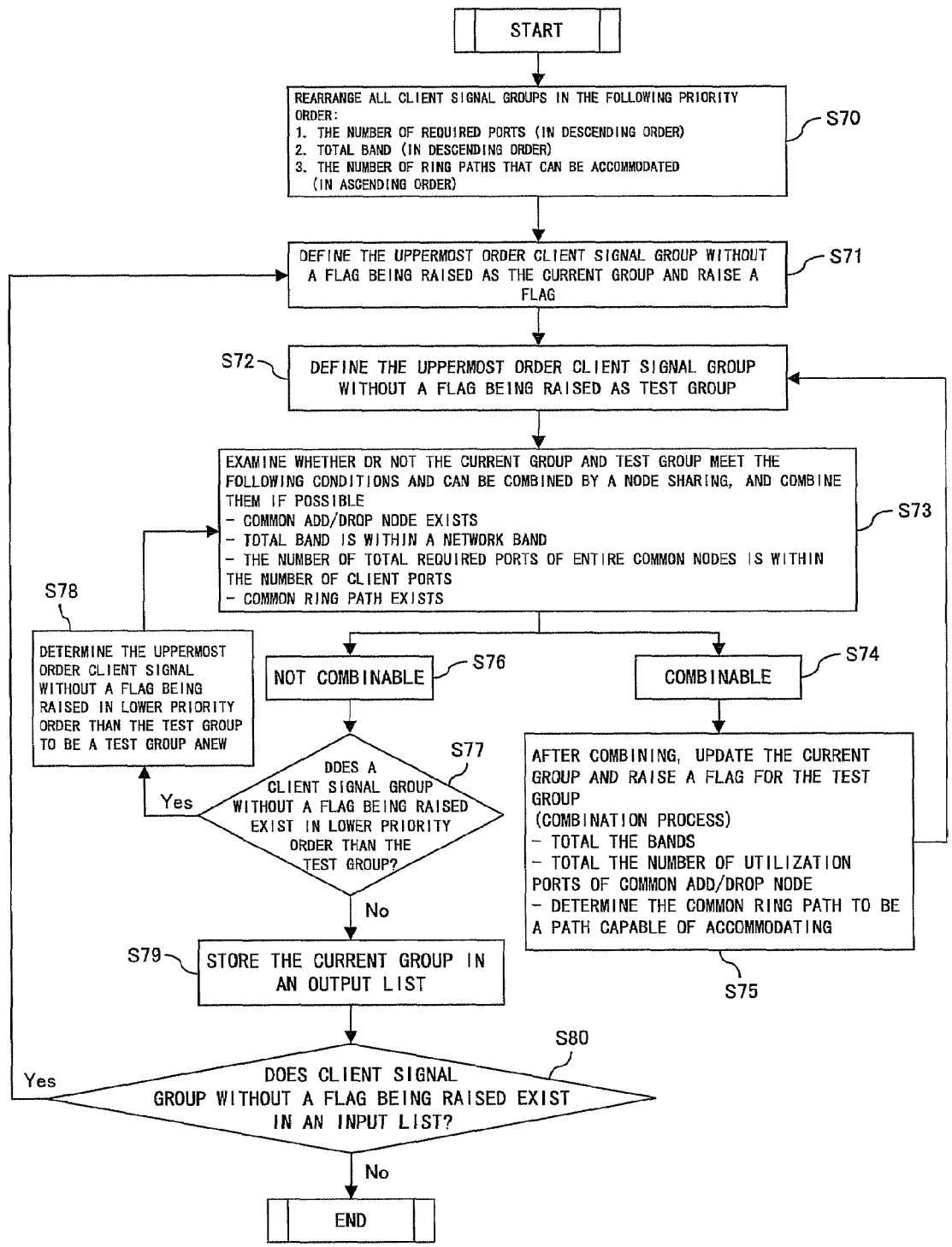
FIG. 19 is a detail flow chart of a client signal group search process becoming combinable by a node sharing.

FIG. 19 is a detail process flow chart of the accommodation design of the step S67 shown in FIG. 17. In this process, an accommodation design for a client signal group is carried out by sharing either of the start or end node as described above. Referring to FIG. 19, as the process starts, first, all client signal groups are prioritized in accordance with priority conditions, i.e., the number of required ports (in descending order), followed by a total band (in descending order), and followed by the number of ring paths that can be accommodated (in ascending order), in the step S70. Then, a client signal group in the uppermost order is defined as the current group and a flag is raised for the signal group in the step S71, followed by defining the uppermost order among the remaining client signal groups, that is, the client signal group in the uppermost order without a flag being raised for, as test group, in the step S72.

In the step S73, it is judged whether or not the current group obtained in the step S71 can be combined with the client signal group of the test group obtained in the step S72 by a node sharing, by judging, firstly, whether or not a common add/drop node exists; secondly, whether or not the total band is within a network band; thirdly, whether or not the number of required ports of entire common nodes is within the number of client ports of an optical transmission/reception card; and fourthly, whether or not a common ring path exists, and if it is judged that they are combinable in the step S74, a flag is raised for the test group and the current group is updated in the step S75. In this event, the bands are totaled, the numbers of utilization ports of common nodes are totaled and the common ring path is determined to be a path capable of accommodating the client signal group, followed by carrying out the process of the step S72 and thereafter.

If it is judged in the step S76 that they are not combinable, it is then judged whether or not a client signal group without a flag being raised for exists in lower priority order than the test group in the step S77, and if such a client signal group exists, the uppermost order client signal without a flag being raised for in lower priority order than the test group is determined to be a test group anew in the step S78, followed by repeating the process of the step S73 and thereafter.

If a client signal group without a flag being raised is judged to be nonexistence in the step S77, a content of the current group is stored in an output list in the step S79, and it is then judged in the step S80 whether or not a client signal group without a flag being raised for exists in an input list of client signal groups. If such a client signal group exists, the process of the step S71 and thereafter are repeated, while if such a client signal does not exist, the process ends.

Figure 20:
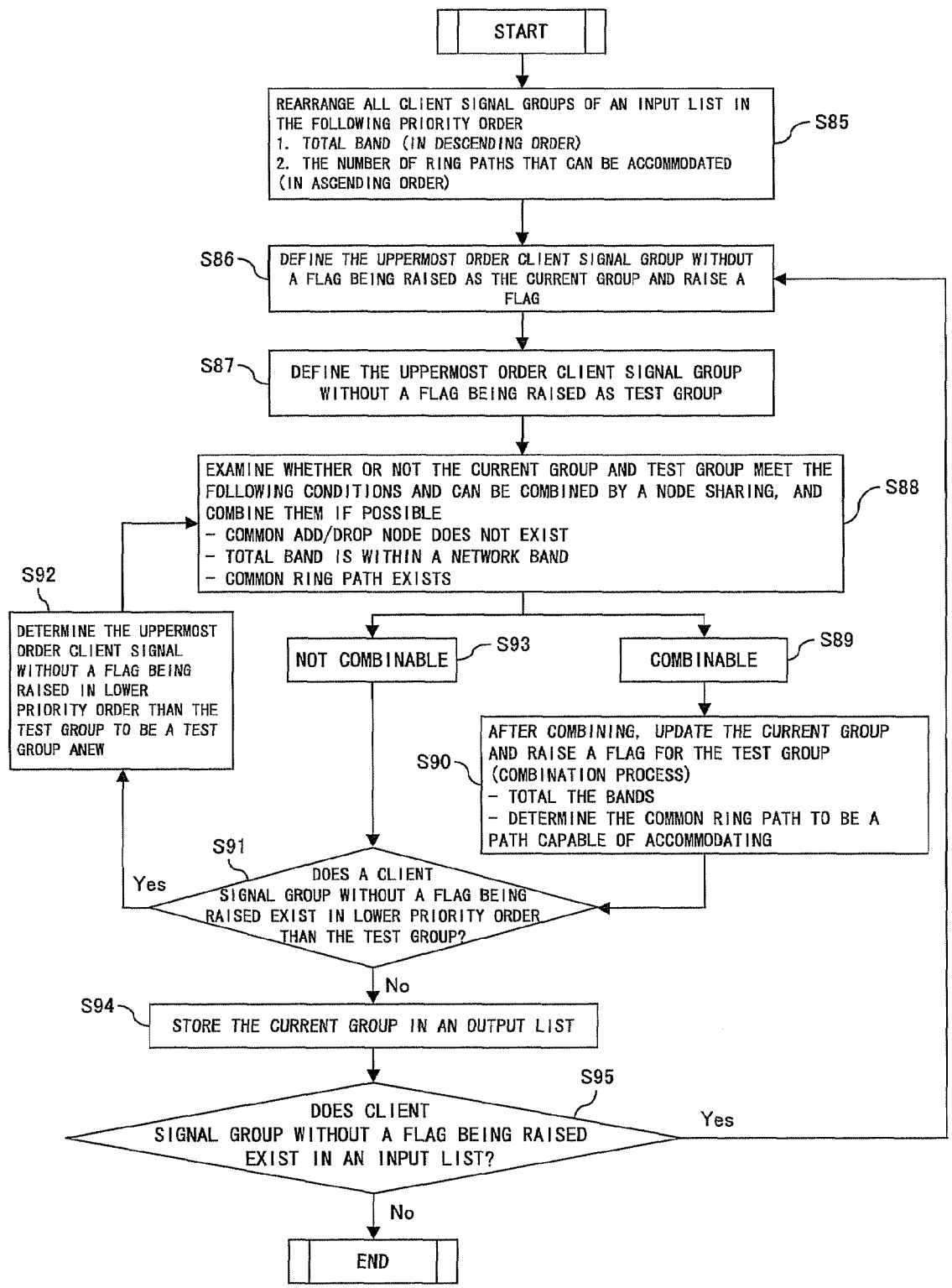
FIG. 20 is a detail flow chart of a client signal group search process becoming combinable without a node sharing.

FIG. 20 is a detail process flow chart of the accommodation design process of the step S68 shown in FIG. 17. The process of FIG. 20 is similar to the content of FIG. 19 that is a flow chart of the detail process of the step S67 shown in FIG. 17, and accordingly the process flow chart of FIG. 20 is described by focusing on the difference with the process of FIG. 19. As the process starts, the entire client signal groups of an input list are rearranged in a priority order in the first step S85, likewise the step S70 shown in FIG. 19. The priority conditions in this event are, first, a total band (in descending order) and, second, the number of ring paths capable of accommodating (in ascending order).

Then, the processes of the steps S86 and S87 are carried out likewise the steps S71 and S72 shown in FIG. 19, followed by the step S88 examining whether or not a combination is possible, likewise the step S73. The judgment conditions in this event are, first, that a common add/drop node does not exist, second, that a total band is within the network band, and third, that a common ring path exists.

If it is judged in the step S89 to be "combinable", a flag is raised for the test group, likewise the step S75 of FIG. 19, in the step S90, and the current group is updated. The combination process in this event are totaling the bands and making the common ring path as path capable of accommodating.

Although the processes of the step S72 and thereafter are repeated after the process of the step S75 in FIG. 19, the process of FIG. 20 judges whether or not a client signal group without a flag being raised for exists in lower priority side than the test group in the step S91, likewise the step S77 of FIG. 19, because the current and test groups are judged for combination under the condition of not sharing a node. If such a client signal group does not exist, the current group as a result of the process of the step S90 is stored in an output list as is in the step S94.

Contrarily, a combination is judged to be not possible in the step S93 corresponding to the result of the examination of the step S88, the process shifts to the step S91 likewise from the step S90 and, if a client signal group without a flag being raised for exists on lower priority side than the test group in the step S91, the uppermost client signal group without a flag being raised for is defined as the test group anew in the step S92, followed by shifting to the process of the step S88. And, after the current group is stored in the output list in the step S94, judged is whether or not a client signal group without a flag being raised for exists in the input list in the step S95, likewise the step S80 shown in FIG. 19 and, if such a client signal group exists, the processes of the step S86 and thereafter are repeated, while if it does not, the process ends.

FIG. 21 exemplifies a comprisal of an optical transmission/reception system to which the optical network design method according to the present invention is applied. Referring to FIG. 21, the optical transmission/reception system comprises a network management system 10, three optical transmission/reception terminal apparatuses 15a through 15c, and an optical fiber 18 interconnecting these optical transmission/reception terminal apparatuses.

The network management system 10 comprises a network design unit 11 and a network operations management unit 12, where the above described optical network design is carried out by the network design unit 11, and an optical network is managed by the network operations management unit 12 corresponding to the design result.

Each optical transmission/reception terminal apparatus 15 comprises an optical add/drop multiplexing (OADM) apparatus 17 for performing an add/drop of a client signal, an element management system (EMS) 16 for generally managing a plurality of optical transmission/reception cards 19, and an optical matrix switch 20 for changing over optical paths of a client signal.

Each optical transmission/reception terminal apparatus 15 sets up the OADM, optical transmission/reception card and such based on an instruction from the network operations management unit 12 corresponding to a design result designed by the optical network design method described by referring to FIGS. 4 through 20, thereby accomplishing an optimal accommodation of a client signal in response to the client signal demand as described for FIG. 6.

Figure 22:
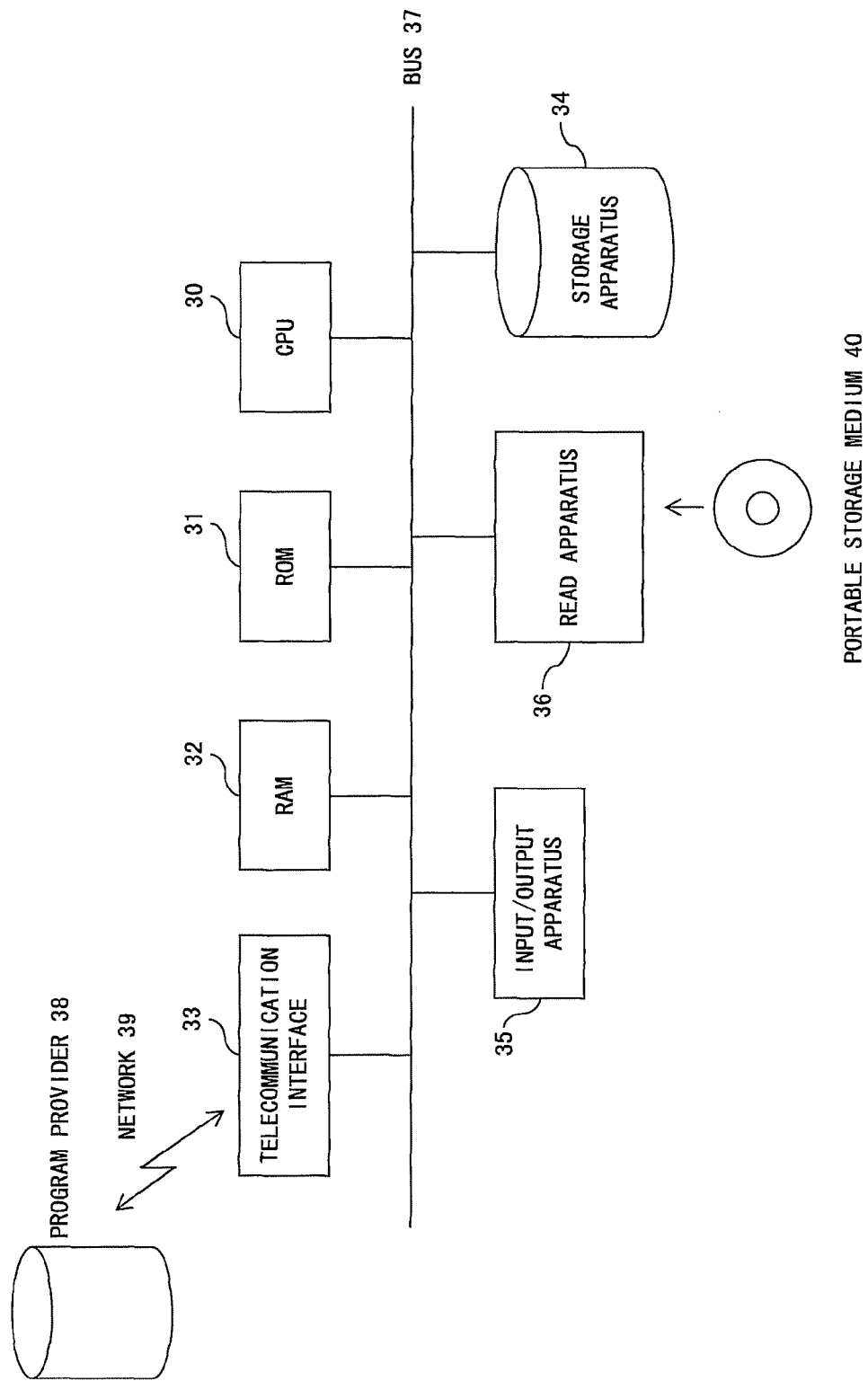
FIG. 22 is a description diagram of a loading of a program for accomplishing the present invention to a computer.

Such is the description of the optical network design method in detail of the present invention, and the optical network design method can of course be implemented by a common computer system. FIG. 22 is a configuration block diagram of such a computer system, that is, a hardware environment.

Referring to FIG. 22, the computer system comprises a central processing unit (CPU) 30, read only memory (ROM) 31, random access memory (RAM) 32, a telecommunication interface 33, a storage apparatus 34, an input/output apparatus 35, a read apparatus 36 for portable storage media, and a bus 37 interconnecting these components.

It is possible to use a various forms of storage apparatus, such as a hard disk and magnetic disk, for the storage apparatus 34. The program as described in claims 7 and 8 of the present invention as well as the program shown by the flow charts of FIGS. 5, 10, 11, 13 through 17, 19, and 20 are stored in the storage apparatus 34 or ROM 31 so that these programs are executed by the CPU 30, thereby enabling an optimal accommodation design for client signal groups having different bandwidths, client-side protection types and signal directions in an optical transmission/reception card according to the present embodiment.

Such a program can be provided by a program provider 38 and stored in the storage apparatus 34 for example by way of a network 39 and telecommunication interface 33; or stored in a portable storage medium 40 that is commercially available through distribution, inserted into the read apparatus 36 and executed by the CPU 30. The portable storage medium 40 can use various forms of storage media such as a DVD, CD-ROM, flexible disk, optical disk, magneto optical disk so that the program stored in such a storage medium is read by the read apparatus 36 and executed by the CPU 30, thereby enabling the optical network design according to the present embodiment.

What is claimed is:

1. An optical network design method for determining an accommodation configuration of accommodating a plurality of client signals to ports of at least one optical transmission/reception card that outputs, as an optical signal, the plurality of client signals by applying a time division multiplexing to the signals of which an optical signal-side protection is the same, wherein
    a computer judges whether or not there exists a client signal of a bandwidth larger than a value that results from dividing an optical signal band of the at least one optical transmission/reception card by the number of utilizable ports for a client signal that is determined by the number of required optical transmission/reception cards for each node of an optical network in accordance with the optical signal-side protection type and by the number of client ports of each optical transmission/reception card;
    if the client signal of the larger bandwidth exists, the computer extracts at least one combination of client signals including one client signal or more having a maximum bandwidth, of client signals of which a total sum of signal bands of the client signals to be accommodated in each optical transmission/reception card is equal to or smaller than an optical signal band thereof, and of client signals of which the number of total ports required in correspondence with the respective client-side protection types of all client signals is equal to the number of utilizable ports for the client signals; and
    the computer selects a combination of client signals of which the total bandwidth of the client signals is a maximum from among the extracted combinations of client signals as the combination of client signals that are accommodated in the at least one optical transmission/reception card.

2. The optical network design method according to claim 1, determining a combination of client signals to be accommodated in an optical transmission/reception card in accordance with an algorithm of a dynamic programming for sequentially determining the number of the client signals to be extracted so as to maximize a total band of the client signals in order of the client signal of large bandwidths under a prescribed band limitation in said extraction of a combination and said selection of a combination.

3. The optical network design method according to claim 2, wherein
    said prescribed band limitation sets a value as a result of subtracting, from an optical signal bandwidth of an optical transmission/reception card, a minimum total bandwidth in the case of accommodating a client signal(s), with an exception of the number of already extracted client signals, to the number of remaining ports of said optical transmission/reception card, as an upper limit.

4. An optical network design method for determining an accommodation configuration of accommodating a plurality of client signals to ports of at least one optical transmission/reception card that outputs, as an optical signal, the plurality of client signals by applying a time division multiplexing to the signals of which an optical signal-side protection is the same, wherein,
    in the case of a client signal of a different signal direction existing among the plurality of client signals, a computer extracts at least one combination of client signals including one client signal or more of which a total of bandwidths of each signal direction is a maximum, of client signals of which a total sum of signal bands of each direction of client signals to be accommodated in each optical transmission/reception card is equal to or smaller than an optical signal band of each optical transmission/reception card, and of client signals of which the number of total ports required in correspondence with individual client-side protection types of entire client signals is equal to the number of utilizable ports for client signals determined by the number of required optical transmission/reception cards for each node within an optical network in accordance with the optical signal-side protection type and by the number of client ports of each optical transmission/reception card; and
    the computer selects a combination of which a value as a result of adding a total bandwidth of each direction of each client signal included in the extracted client signals for all directions is a maximum as the combination of client signals that are accommodated in the at least one optical transmission/reception card.

5. The optical network design method according to claim 4,
    assigning a priority order to a client signal in accordance with a category of a direction of said different signal directions and with a magnitude of bandwidth for each of the category, and
    determining a combination of client signals that are accommodated in said optical transmission/reception card in accordance with an algorithm of a dynamic programming for determining the number of client signals within said combination in order of the priority order so as to maximize a total bandwidth for each of the directions of combination of client signals under a prescribed band limitation in said extraction of a combination and said selection of a combination.

6. The optical network design method according to claim 5, wherein said prescribed band limitation sets a value as a result of subtracting, from an optical signal bandwidth of an optical transmission/reception card, each minimum total bandwidth of each of said directions in the case of accommodating an undetermined number of client signal(s), with an exception of the number of already extracted client signals, to remaining ports of said optical transmission/reception card, as an upper limit.

7. The optical network design method according to claim 1, repeating said extraction of the at least one combination reflexively by decrementing the number of total utilizable ports for a combination of client signals until a combination thereof meeting an extraction condition is found if the combination of client signals meeting the condition is not found in the extraction of the at least one combination.

8. The optical network design method according to claim 1, further comprising:
  carrying out a design for accommodating a client signal by applying the optical network design method corresponding to information of a ring path capable of transmitting an optical signal between a pair of multiplexers, a utilization band width of an optical signal between the pair thereof and the number of ports on a client side utilized at the multiplexer for all pairs of the multiplexers included in said optical network built on an optical fiber network laid out in a mesh pattern, with each of the multiplexers comprising said optical transmission/reception card; and
  carrying out a design for accommodating a client signal by applying the optical network design method according to claim 1 to a multiplexer common to a pair thereof having the common ring path enabling a transmission and having a spare port for accommodating the client signal.

9. The optical network design method according to claim 8, further carrying out a design for accommodating client signals of which start points and end points are different so as to maximize a utilization of an optical signal band of a multiplexer in the design for accommodating client signals to the multiplexer included in said optical network.

10. An optical network designed by using the optical network design method according to claim 1.

11. A computer readable storage medium storing an optical network design program for determining an accommodation configuration of accommodating a plurality of client signals to ports of at least one optical transmission/reception card that outputs, as an optical signal, the plurality of client signals by applying a time division multiplexing to the signals of which an optical signal-side protection is the same, wherein the program makes a computer execute the steps of
  judging whether or not that exists a client signal of a bandwidth larger than a value that results from dividing an optical signal band of the at least one optical transmission/reception card by the number of utilizable ports for a client signal that is determined by the number of required optical transmission/reception cards for each node of an optical network in accordance with the optical signal-side protection type and by the number of client ports of each optical transmission/reception card;
  extracting at least one combination of client signals including one client signal or more having a maximum bandwidth, of client signals of which a total sum of signal bands of the client signals to be accommodated in each optical transmission/reception card is equal to or smaller than an optical signal band thereof, and of client signals of which the number of total ports required in correspondence with the respective client-side protection types of all client signals is equal to the number of utilizable ports for the client signals if the client signal of the larger bandwidth exists; and
  selecting a combination of client signals of which the total bandwidth of the client signals is maximum that is included in the extracted combinations of client signals as the combination of client signals that are accommodated in the at least one optical transmission/reception card.

12. A computer readable storage medium storing an optical network design program for determining an accommodation configuration of accommodating a plurality of client signals to ports of at least one optical transmission/reception card that outputs, as an optical signal, the plurality of client signals by applying a time division multiplexing to the signals of which an optical signal-side protection is the same, wherein the program makes a computer execute the steps of,
  in the case of a client signal of a different signal direction existing among the plurality of client signals, extracting at least one combination of client signals including one client signal or more of which a total of bandwidths of each signal direction is a maximum, of client signals of which a total sum of signal bands of each direction of client signals to be accommodated in each optical transmission/reception card is equal to or smaller than an optical signal band of each optical transmission/reception card, and of client signals of which the number of total ports required in correspondence with individual client-side protection types of entire client signals is equal to the number of utilizable ports for client signals determined by the number of required optical transmission/reception cards for each node within an optical network in accordance with the optical signal-side protection type and by the number of client ports of each optical transmission/reception card; and
  selecting a combination of which a value as a result of adding a total bandwidth of each direction of each client signal included in the extracted client signals for all directions is a maximum as the combination of client signals that are accommodated in the at least one optical transmission/reception card.

13. An optical network design method for determining an accommodation configuration of accommodating a plurality of client signals to ports of an optical transmission/reception card outputting an optical signal by applying a time division multiplexing to the plurality of client signals including signals of different directions, wherein
  a computer extracts at least one combination of client signals of which a total sum of signal bands of each direction of the client signals to be accommodated in each optical transmission/reception card is within an optical signal band of an individual optical transmission/reception card and also the number of ports required for accommodating all client signals is equal to or smaller than the number of total ports of a plurality of optical transmission/reception card, and
  the computer selects a combination of client signals of which a value as a result of adding a total bandwidth of each direction of each client signal included in the extracted client signals for all directions is a maximum, as the combination of client signals that is accommodated in the plurality of optical transmission/reception cards.

14. The optical network design method according to claim 13, wherein
  the number of said plurality of optical transmission/reception cards is the number of the cards required for each node within an optical network in response to an optical signal-side protection type corresponding to said plurality of client signals, wherein
  said number of total ports is determined from the number of required cards and the number of client ports of each optical transmission/reception card.

15. The optical network design method according to claim 14, wherein said optical signal-side protection type is the same for said plurality of client signals.

16. The optical network design method according to claim 13, extracting a combination including one or more of a client signal of which a total of bandwidth of each signal direction is a maximum in said extraction of a combination.

* * * * *